United States Patent [19]

Cyrus et al.

[11] Patent Number: 5,993,283
[45] Date of Patent: Nov. 30, 1999

[54] MODULAR BUILDINGS FOR A TOY BUILDING SET

[75] Inventors: Peter Cyrus; Sean Cryan; Steve Proctor; Rich Franko, all of Seattle; Chris Brady, Bothell; David Wicklander; Gary Franz, both of Seattle; Matt Gibson, Spokane, all of Wash.

[73] Assignee: Parvia Corporation, Seattle, Wash.

[21] Appl. No.: 08/940,618

[22] Filed: Sep. 30, 1997

[51] Int. Cl.⁶ .............................. A63H 33/08; E04B 2/00
[52] U.S. Cl. .................... 446/124; 446/108; 446/115; 446/127; 52/586.2
[58] Field of Search ................................ 446/108, 110, 446/112, 113, 115, 122, 124, 127, 476, 489; 52/586.1, 586.2, 582.1, 391

[56] References Cited

U.S. PATENT DOCUMENTS

| | | |
|---|---|---|
| D. 304,484 | 11/1989 | Knudsen . |
| D. 306,188 | 2/1990 | Tapdrup et al. . |
| D. 306,190 | 2/1990 | Poulsen . |
| D. 307,775 | 5/1990 | Pedersen . |
| D. 366,914 | 2/1996 | Frederiksen . |
| D. 367,896 | 3/1996 | Knudsen . |
| D. 367,897 | 3/1996 | Schmidt et al. . |
| 681,946 | 9/1901 | Bennett ...................................... 52/391 |
| 1,393,163 | 10/1921 | Rasely . |
| 2,610,856 | 9/1952 | Welty ...................................... 446/124 |
| 2,674,813 | 4/1954 | Hutchinson . |
| 2,871,619 | 2/1959 | Walters . |
| 2,942,354 | 6/1960 | Grain . |
| 3,005,282 | 10/1961 | Christiansen . |
| 3,025,626 | 3/1962 | Schumacher . |
| 3,034,254 | 5/1962 | Christiansen . |
| 3,162,973 | 12/1964 | Christiansen . |
| 3,234,683 | 2/1966 | Christiansen . |
| 3,236,004 | 2/1966 | Christiansen . |
| 3,242,610 | 3/1966 | Christiansen . |
| 3,284,946 | 11/1966 | Christiansen . |
| 3,352,054 | 11/1967 | Glass et al. . |

(List continued on next page.)

FOREIGN PATENT DOCUMENTS

| | | | |
|---|---|---|---|
| 2744145 | 4/1979 | Germany ................................ | 446/124 |
| 586805 | 4/1947 | United Kingdom .................... | 446/127 |

*Primary Examiner*—Robert A. Haffer
*Assistant Examiner*—Laura Fossum
*Attorney, Agent, or Firm*—Christensen O'Connor; Johnson & Kindness PLLC

[57] ABSTRACT

A modular building for a toy building set includes a planar member, or foundation, having raised ribs on its top and a wall member having a wall portion and a base portion. The wall portion of the wall member is substantially orthogonal to the base portion of the wall member. The base portion of the wall member has a cleft therein sized to receive one of the ribs of the foundation to removably attach the wall member to the foundations. A substantially planar coupler connects at least two or more of the foundation. The coupler has at least two clefts therein. The clefts are sized to receive the ribs on each of the two foundations for removable attachment of the foundation to the coupler.

47 Claims, 22 Drawing Sheets

U.S. PATENT DOCUMENTS

| | | |
|---|---|---|
| 3,461,601 | 8/1969 | Kristiansen . |
| 3,475,851 | 11/1969 | Christiansen . |
| 3,597,858 | 8/1971 | Ogsbury . |
| 3,597,875 | 8/1971 | Christiansen . |
| 3,667,153 | 6/1972 | Christiansen . |
| 3,742,620 | 7/1973 | Knoll . |
| 3,981,506 | 9/1976 | Daniel et al. . |
| 4,028,844 | 6/1977 | Dideriksen et al. . |
| 4,074,496 | 2/1978 | Fischer ................................. 52/622 |
| 4,176,493 | 12/1979 | Dideriksen . |
| 4,185,410 | 1/1980 | Kristiansen . |
| 4,203,248 | 5/1980 | Tapdrup . |
| 4,205,482 | 6/1980 | Christiansen et al. . |
| 4,214,403 | 7/1980 | Knudsen . |
| 4,245,400 | 1/1981 | Johnson . |
| 4,403,733 | 9/1983 | Bach et al. . |
| 4,430,063 | 2/1984 | Bach et al. . |
| 4,430,826 | 2/1984 | Ryaa . |
| 4,461,116 | 7/1984 | Bach . |
| 4,556,393 | 12/1985 | Bolli . |
| 4,579,041 | 4/1986 | Organ et al. . |
| 4,589,702 | 5/1986 | Bach et al. . |
| 4,685,884 | 8/1987 | Rohan . |
| 4,715,832 | 12/1987 | Bach . |
| 4,726,515 | 2/1988 | Bolli et al. . |
| 4,728,310 | 3/1988 | Valtolina et al. ................. 446/111 |
| 4,743,202 | 5/1988 | Bach . |
| 4,846,750 | 7/1989 | Tapdrup . |
| 4,854,742 | 8/1989 | Bach . |
| 4,861,306 | 8/1989 | Bolli et al. . |
| 4,874,176 | 10/1989 | Auerbach ........................ 446/124 |
| 4,883,440 | 11/1989 | Bolli . |
| 4,894,040 | 1/1990 | Bach et al. . |
| 4,897,066 | 1/1990 | Tapdrup et al. . |
| 4,937,181 | 6/1990 | Rogers . |
| 4,978,301 | 12/1990 | Dodge . |
| 4,988,322 | 1/1991 | Knudsen . |
| 4,988,324 | 1/1991 | Ryaa et al. . |
| 4,990,116 | 2/1991 | Chen ................................. 446/124 |
| 4,992,069 | 2/1991 | Bolli et al. . |
| 4,998,903 | 3/1991 | Bolli et al. . |
| 5,011,411 | 4/1991 | Loewy . |
| 5,015,210 | 5/1991 | Dideriksen . |
| 5,042,972 | 8/1991 | Bach et al. . |
| 5,049,078 | 9/1991 | Thomsen . |
| 5,049,104 | 9/1991 | Olsen . |
| 5,071,384 | 12/1991 | Poulsen . |
| 5,087,001 | 2/1992 | Bolli et al. . |
| 5,094,643 | 3/1992 | Bolli et al. . |
| 5,112,263 | 5/1992 | Penillard et al. . |
| 5,251,900 | 10/1993 | Gallant . |
| 5,304,086 | 4/1994 | Bolli et al. . |
| 5,322,466 | 6/1994 | Bolli et al. . |
| 5,326,267 | 7/1994 | Brokaw . |
| 5,348,478 | 9/1994 | Bradshaw . |
| 5,349,734 | 9/1994 | Poulsen et al. . |
| 5,360,364 | 11/1994 | Poulsen et al. . |
| 5,373,791 | 12/1994 | Bach et al. . |
| 5,378,191 | 1/1995 | Ryaa . |
| 5,380,232 | 1/1995 | Berggreen et al. . |
| 5,387,148 | 2/1995 | Dideriksen et al. . |
| 5,417,603 | 5/1995 | De Chazal . |
| 5,427,530 | 6/1995 | Taggart . |
| 5,427,558 | 6/1995 | Knudsen et al. . |
| 5,494,471 | 2/1996 | Ryaa et al. . |
| 5,580,295 | 12/1996 | Ruzskai et al. . |
| 5,596,181 | 1/1997 | Bach et al. . |
| 5,643,038 | 7/1997 | Olsen et al. . |
| 5,645,463 | 7/1997 | Olsen . |
| 5,775,046 | 7/1998 | Fanger et al. ..................... 446/127 |

MODULAR BUILDINGS FOR A TOY BUILDING SET

FIELD OF THE INVENTION

The invention relates to toy buildings and, more particularly, to modular buildings removably attachable to a toy building set.

BACKGROUND OF THE INVENTION

In U.S. Pat. No. 5,427,530, a portable water pollution model and method are disclosed that provide an improved device and method for simulating water pollution. This invention includes a portable simulated watershed model, including a simulated body of water and a simulated water pollution source; a simulated water pollutant, placeable on selected portions of the model; a simulated best management practice for pollution minimization, placeable on selected portions of the model; and a fluid dispenser capable of simulating rain over the watershed model. This invention further includes a method for simulating water pollution including providing a portable simulated watershed model, providing a simulated water pollutant, placing the simulated pollutant on selected portions of the model, providing a simulated best management practice, placing the simulated practice on selected portions of the model, and simulating rain over the model.

In U.S. Pat. No. 5,417,603, a playing structure includes a plurality of playing structure modules connectable together to form an array having a generally continuous, visually fluid, three-dimensional playing surface. Each playing structure module has a reversible top to allow the topography of the playing surface to be changed. The top of each playing structure module has a different three-dimensional topography on either side thereof. Each playing structure module may have a different or the same top. The playing surfaces have a coloured landscape painted thereon to depict lakes, countrysides, roadways etc. and the like. The topography of the playing surfaces and the painted landscapes are designed so that the certain symmetries exist. In particular, when a plurality of playing structure modules are assembled to form an array and the tops of the playing structure modules are arranged to provide a playing surface having a continuous, visually fluid landscape, any one of or all of the tops can be reversed along a diagonal and the landscape of the resulting playing surface will still be continuous and visually fluid. This of course increases the number of different playing surfaces which can be created with the playing structure modules.

In U.S. Pat. No. 5,348,478, a modular terrain board is provided having a plurality of sections or terrain cell plugs which are held in place by a baseboard assembly having a corresponding plurality of cell receiving sections or cells formed therein. The terrain cell plugs can be easily removed to allow for quick and accurate reconfiguration of the terrain model. The terrain board has means for representing buildings, rivers, lakes, roads, and other topographical features.

In U.S. Pat. No. 5,326,267, model terrain accessories that are positioned for use on the surface of a miniature landscape are fabricated from a permanently flexible material, preferably polyvinyl chloride. These flexible accessories are realistically contoured models representing roads, streams, stream banks, earthworks, and walls, or segments thereof. These flexible accessories will conform to changes in surface elevation on any miniature landscape on which they are assembled. The flexible accessories fit together easily in an infinite variety of individual and group configurations, and can be easily removed from the landscape surface and reused when desired.

U.S. Pat. No. 5,251,900 discloses a puzzle formed of a plurality of puzzle pieces which, when assembled, create a self-standing, three-dimensional building structure. The puzzle pieces are of irregular, polygonal shape, but all puzzle pieces are flat, planar blocks. The blocks are releasably interlocked about a common plane with first, edgewise, complementary dovetail joints. For interlocking puzzle walls that are transverse to one another, second, straight U-shape, edgewise, complementary tenon and mortise joints are further provided edgewisely of those corner blocks for frictional interlocking. Thus, no separate pin, bent units or the like are required to anchor the corner portions of the three dimensional structure. The self-standing, enclosing structure is continuous, and shows a continuous image on its external face.

U.S. Pat. No. 5,011,411 discloses a method making a non-repetitive modular design. The design is created by assembling a plurality of substantially identical modules to cover a surface. Each module has the shape of a polygon, especially a regular polygon, such as a square. The design of each module is created in the following manner. First, one selects a set of points, disposed symmetrically around the midpoint of a side of the polygon, and duplicates the same pattern of points for the remaining sides. Then, one connects every pair of points with a line, such that the lines so drawn form a pattern which is not symmetrical around any imaginary straight line joining any pair of vertices of the polygon. The spaces between lines, or between one or more lines and one or more sides of the polygon, can be filled in with a color, or with any other design element. To make the final design, one provides a plurality of such modules, and arranges them, with random orientations, to cover a surface. The design is non-repetitive, and any orientation of the individual modules will produce a valid design. The appearance of the design is varied by changing the orientation of one or more of the modules. In general, the appearance of the overall design is quite different from that of each of the modules. The modules made according to the invention can be used as floor tiles, or they can be otherwise secured permanently to a solid substrate for decorative purposes.

In U.S. Pat. No. 4,992,069, the plug-in building blocks of a building set have protruding connecting pins and corresponding mating connecting sockets. In order that bendproof trusses can also be built, the building set has single-row connecting bars with two terminal pins, whose spacing from one another amounts to $\sqrt{2}$ times an integral multiple of the modulus, and girder elements, which at two bordering sides faces each have a single row of pins with modular spacing and parallel to these side faces each have a projection set back by the thickness of the connecting bar. In this way, stable, aesthetically appealing trussings can be built with the building set.

In U.S. Pat. No. 4,988,322, a toy building set for building tree-like models comprises a trunk element and a branch element. The trunk element comprises a trunk portion and projecting branches having coupling means spaced from the trunk portion. The branch element comprises a plurality of connecting bars, at whose ends coupling bushings are provided. These bushings are formed with primary and secondary coupling means respectively, so that the branch elements may be interconnected and connected with the trunk elements. Preferably, said bars have additional branching portions whose ends are provided with bushings similar to the coupling bushings.

U.S. Pat. No. 4,978,301 discloses a construction set suitable and safe for children of various ages comprising construction pieces and connector strips. The construction pieces have a semirigid planar construction with opposing major sides which have hook fastener material disposed on one side and loop pile fastener material disposed on the other. The fastener materials are of the type which adhere when pressed together. An outer border or margin area of the construction pieces is kept free of the fastener materials, to provide a tab or hem for separating attached pieces. The construction pieces have various shapes and sizes with which many designs and structures may be constructed. The connector strips have a similar construction to the construction pieces and are used to join adjacent construction pieces. The sides may include complementary colors and patterns.

U.S. Pat. No. 4,937,181 discloses an educational visual display system for teaching geography in which objects having some geographical or topographical significance, e.g., states of the Union, may be detachably affixed and arranged to demonstrate relationship between the objects. The system includes a primary background surface of iron velvet fabric material to which hook type fasteners may be detachably adhered, a plurality of primary objects having geographical significance and comprising a soft foam core with a layer of iron velvet fabric on one side and a plurality of hook type fasteners on the other side, the primary objects being arrangeable to represent in combination a larger geographical unit, and a plurality of secondary objects each having geographical or topographical significance and having hook type fasteners on one side thereof for being detachably affixable to the layer of iron velvet fabric of the primary objects. The iron velvet fabric and the hook type fasteners function as an attachment pair similar to hook and loop fasteners sold under the tradename VELCRO®.

U.S. Pat. No. 4,874,176 discloses a three-dimensional puzzle including puzzle pieces having discrete surfaces, at least one surface of which has a three-dimensional sculpted form whereby the sculpted surfaces in the aggregate upon assembly of the puzzle form a continuous three-dimensional pictorial representation. Abutting sides of the puzzle pieces may be interlocking or three-dimensional for conformal abutting relation with the sides of opposed puzzle pieces. Filler pieces are also provided underlying the puzzle pieces for elevating the sculpted surfaces of the puzzle pieces. The puzzle pieces and filler pieces may be disposed on a base which may have an edge containment whereby non-interlocking puzzle and filler pieces may be used. The puzzle and filler pieces may be vertically interlocked against lateral movement and with respect to the base by projections received in corresponding recesses.

In U.S. Pat. No. 4,846,750, a base for a building set is provided with coupling studs for mounting building blocks having corresponding coupling elements. The base is further provided with cavities contoured to receive at least some of the building blocks. The cavities preferably extend from the side opposite the side provided with the coupling studs.

U.S. Pat. No. 4,743,202 discloses a toy building block having on one face thereof at least one row of mechanical coupling pins and opposite thereto mechanical counter-coupling tubes for coupling said toy building block to a similar toy building block either with the row of said coupling pins parallel to a corresponding row of coupling pins of said similar block or perpendicular to said corresponding row. The toy building block includes first and second current paths connected to first and second contact areas respectively designed to establish electrical connection with first and second contact areas in a similar block. The first and second contact areas are disposed in first and second angular sectors about adjacent coupling pins. The angular sectors are offset from each other and do not overlap regardless of whether the building block row of coupling pins is parallel or perpendicular to the row of coupling pins of the similar block.

U.S. Pat. No. 4,715,832 discloses a building element of the type which contains current-carrying components placed in the electrically insulated building block. There are provided at least two current-carrying components with respective contact areas which are mutually- co-axially positioned. The building blocks can be intercoupled mechanically while establishing electrical connection between the respective current rails in the cooperating building elements, without any risk of short circuiting between the two current-carrying components, no matter how the building blocks are intercoupled mechanically.

U.S. Pat. No. 4,685,884 discloses a multitude of parts of three-dimensional shape have full edges and also edge segments adapted for abutment with like edges and edge segments of other parts. The parts additionally include non-abutting irregular or curved edges which may represent terrain contour lines or the bank of a body of water. Inclined areas on the parts are adjacent the irregular or curved edges and represent sloped terrain which is continuous with like inclined areas on other abutting parts. The inclined area of a part may be dispensed with to provide a vertical surface to simulate an escarpment.

U.S. Pat. No. 4,556,393 discloses a building block having side walls and a perpendicular front with two rows of coupling pins on one side of the front face and counter-coupling tubes on the other side for mechanically coupling two building blocks by means of a clamping action. In each row, each second coupling pin has an electrically conducting surface, while the coupling pins lying between these are electrically insulating. One row of conducting pins is displaced in the direction of the rows by one coupling pin from the adjacent row. On the other side of the front wall a contact bar is arranged which is connected electrically with the conducting coupling pins of an associated row. The bar has a contact area for producing electrical contact with a row of conducting coupling pins of an adjacent, coupled building block.

U.S. Pat. No. 4,461,116 discloses a connecting member comprising an elastically deformable, tubular plug slitted at the ends for interconnecting pairs of building components, which have coupling holes to receive the ends of the connecting member. Apertures are in the plug wall between the slits. The plug wall is formed with lengthwise extending clamping wedges between the apertures. The clamping wedges have inclined faces which slope towards the ends of the connecting member and cause the connecting member to be compressed at the center and be expanded at the ends when it is pressed into a pair of co-axial holes in adjacent building components. The connecting member may in particular be formed with an annular flange and end beads which fit in corresponding annular grooves in a pair of adjacent components.

U.S. Pat. No. 4,245,400 discloses a three dimensional toy having a base member showing a housing development with structural profile members mounted thereon which are secured by profile locking elements for constructing elevations of roadways, lots and surrounding terrain. The profile members and locking elements also serve as retaining walls for soil which, when shaped to conform to the contours of the profile members and locking elements and provided with living plants defines the topography of a living housing development.

U.S. Pat. No. 4,185,410 discloses a suspension device for slideable and pivotal suspension of a base plate for toy building sets or base boards for visual planning panels. One face of the base plate or board is provided with rows of coupling studs including a plurality of studs uniformly spaced apart in both longitudinal and transverse directions, and the suspension device includes a gripping member having inwardly projecting guides adapted to slide along the base plate between a pair of rows of projections and to support the base plate when suspended on a wall. The device is further provided with a hinge member pivotally mounted on top of the gripping member, so as to provide for pivotal movements of the base plate relatively to a wall on which the base plate is mounted by means of the slideable suspension device.

U.S. Pat. No. 4,176,493 discloses a rotatable element comprising a base plate and a disc pivotally mounted in a circular aperture in the base plate. A socket for a pivot on the disc is located at the bottom of the plate and is supported thereon by ribs integral with the socket and with four side walls at the bottom of the base plate. Four identical apertures in the bottom of the base plate are formed by the socket, the ribs and the side walls. Four engagement studs are provided on the top face of the disc and extend beyond the periphery thereof. The underface of these studs provides for slideable contact with the top face of the base plate during the rotation of the disc.

In U.S. Pat. No. 3,981,506, a plurality of parallelepiped blocks having varying heights, planar sides and a curved upper surface are connected together by special pin and hole interlocks randomly spaced in predetermined locations to form a three dimensional puzzle with at least a curved upper surface. Two or more puzzles can be made by initially assembling the blocks into a polyhedron with six rectangular faces and sawing along a predetermined path to separate the polyhedron into individual puzzles.

In U.S. Pat. No. 3,742,620, there is provided an apparatus for demonstrating the inter-relationship of a landscape, and the contour lines representing said landscape in two- and three-dimensional representation. A transparent plate is supported over and free from the model and contour lines connecting points of the same height on the model are drawn upon the said plate using a substantially ablative transfer material, said contour lines are transferred onto transfer receiving material slabs and layers of the material corresponding to the contour lines are produced by cutting along the contour lines. The contour slabs are then stacked upon each other to give a three-dimensional representation of the model. In a further modification, the contour slabs are colored in such a manner that at least adjacent slabs are of a different color. Upon compression of the contour model by a transparent plate, a two-dimensional contour representation is again visible.

U.S. Pat. No. 3,667,153 discloses the coupling of two plate-shaped elements by means of an interlocking arrangement formed along the edges of the elements. The locking members of one element are in resilient engagement with identical locking members on the other element, the thickness of the individual locking members being half the thickness of the element, and the members being staggered alternately to one side and the other of a plane through the center of the edge parallel to the side faces of the element.

U.S. Pat. No. 3,597,875 discloses toy building blocks of similar shape but constructed to different modules. The inner protrusions of the smaller blocks coact with the outer projections of the larger blocks.

In U.S. Pat. No. 3,597,858, there is provided a plurality of building elements dimensionally related to conform to a selected scale having interlocking socket and beaded joint portions which may be assembled into a wide variety of composite structures including scale model buildings. The socket joint portion is slotted for insertion of the beaded joint portion and firmly grips the beaded joint portion to hold the elements in particular angular relation while at the same time permitting substantial forced rotational and sliding movement between elements. One of the elements is a flat panel which may be of a variety of geometric shapes and another of the elements is a connector of preselected lengths having plural joint portions arranged in angular spaced relation to one another about a common midpoint.

SUMMARY OF THE INVENTION

A modular building for a toy building set includes a planar member, or foundation, having raised ribs on its top and a wall member having a wall portion and a base portion. The wall portion of the wall member is substantially orthogonal to the base portion of the wall member. The base portion of the wall member has a cleft therein sized to receive one of the ribs of the foundation to removably attach the wall member to the foundation. A substantially planar coupler connects at least two or more of the foundations. The coupler has at least two clefts therein. The clefts are sized to receive the ribs on each of the two foundations for removable attachment of the foundation to the coupler.

Preferably, the raised ribs on the foundation have beveled edges and the clefts on the wall member and on the coupler have beveled edges complementary to the beveled edges of the ribs of the foundation. Four raised ribs are preferably present on the top of the foundation. The raised ribs are most preferably disposed substantially perpendicular to one another in a substantially cross-shaped configuration. The foundation has attachment fittings on its bottom that are preferably clover leaf in shape. These attachment fittings allow removable attachment to a supporting substructure, such as a base, that has mating attachment fittings on the top surface thereof that can be, for example, square-shaped recesses that interference fit with the clover leaf shaped protrusions on the bottom of the foundation. The foundation also has attachment fittings, such as square-shaped openings, on its edges for removable attachment of building subassemblies, such as steps, thereto.

Preferably, the clefts of the wall member and of the coupler are bounded by a pair of wings that are triangular in shape. The wings are configured such that wings of adjacent wall members or couplers abut when attached to adjacent ribs of the foundation. The raised ribs of the foundation and the wings of the wall member and of the coupler are of the same thickness such that the top of the planar member has a uniform surface over it formed by the raised ribs and wings.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENTS

Figure 1:
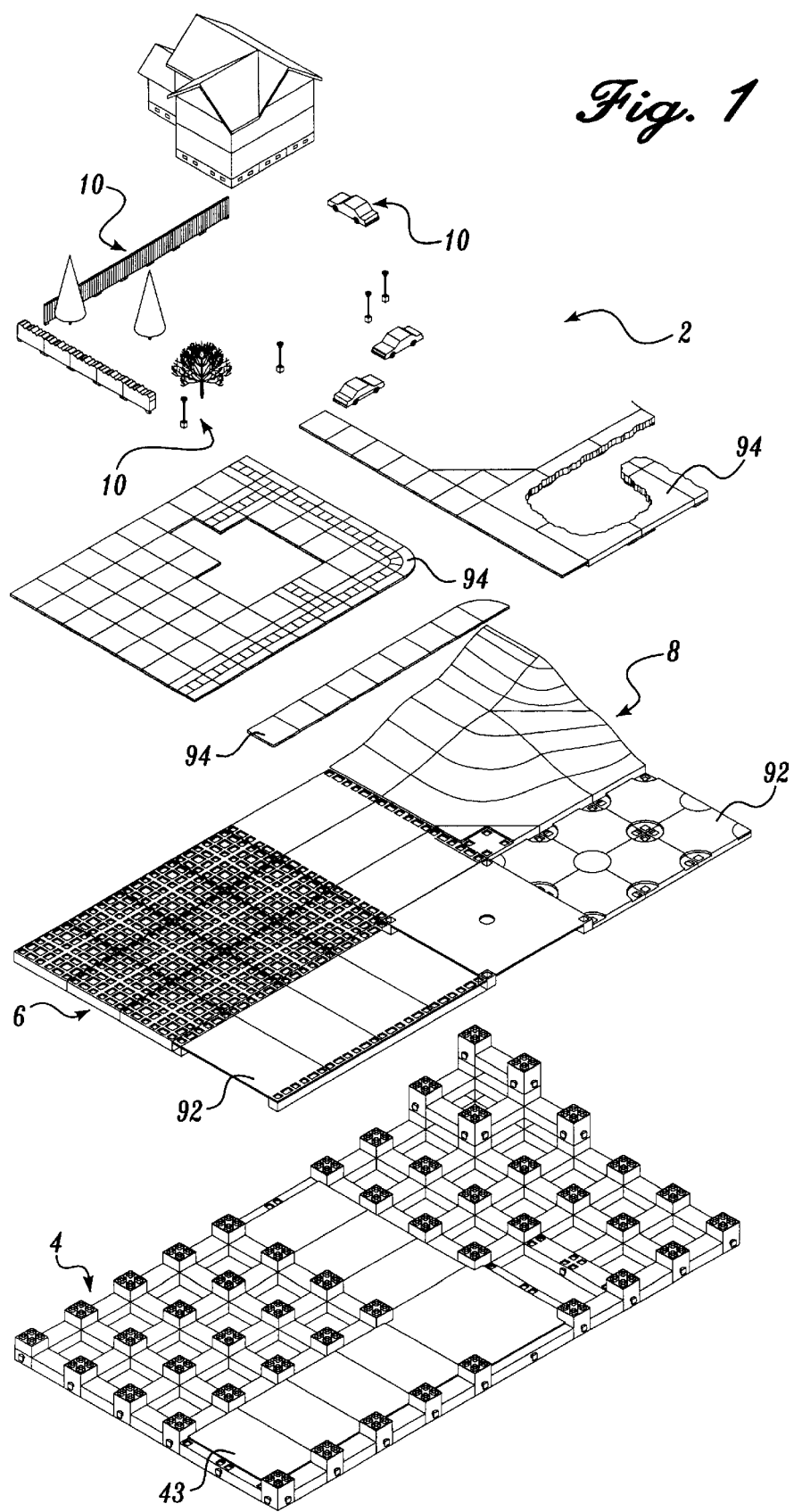
FIG. 1 is an exploded isometric view of the modular toy building set embodying the present invention.
Figure 2:
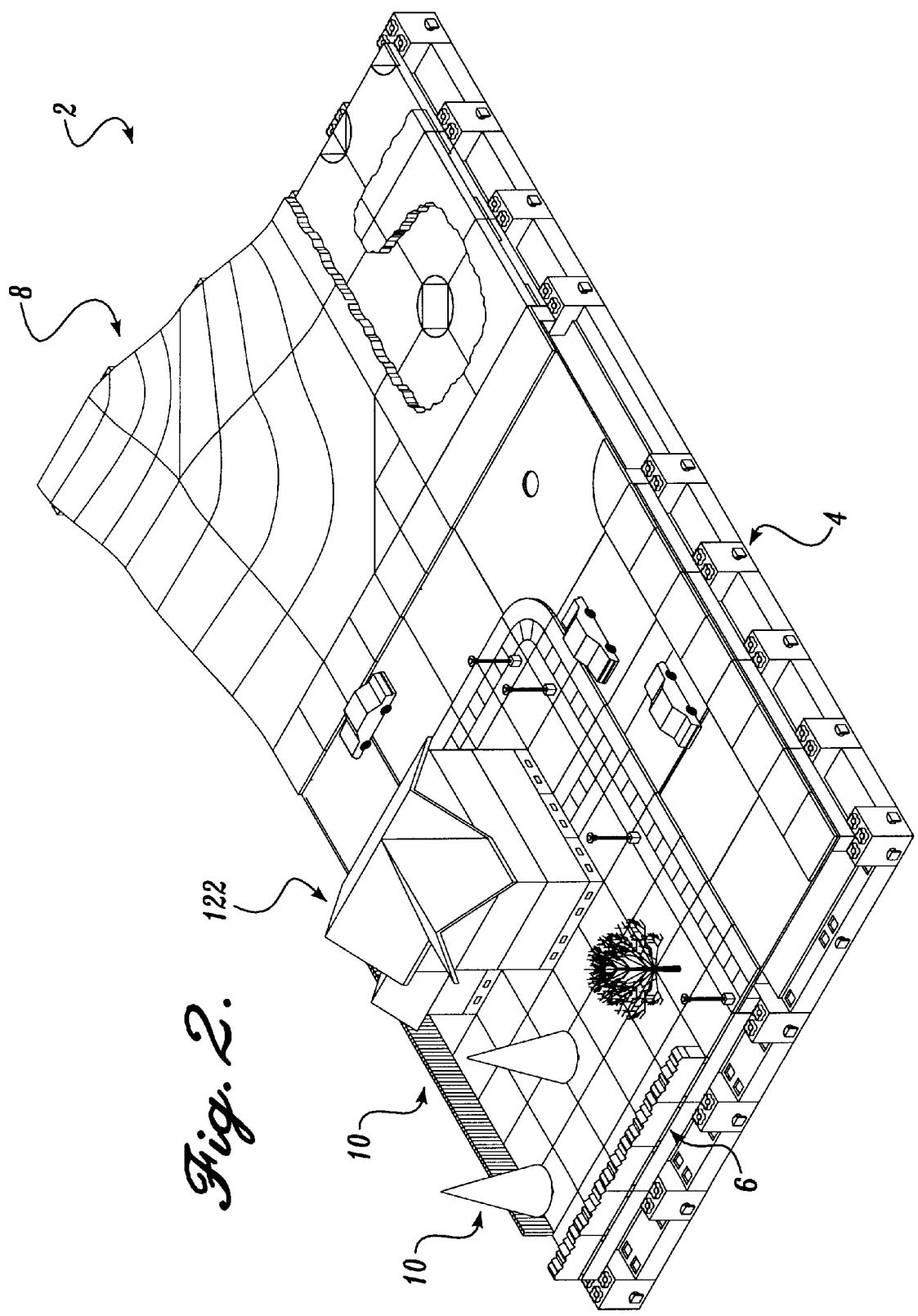
FIG. 2 is a isometric view of the modular toy building set embodying the present invention.
Figure 3:
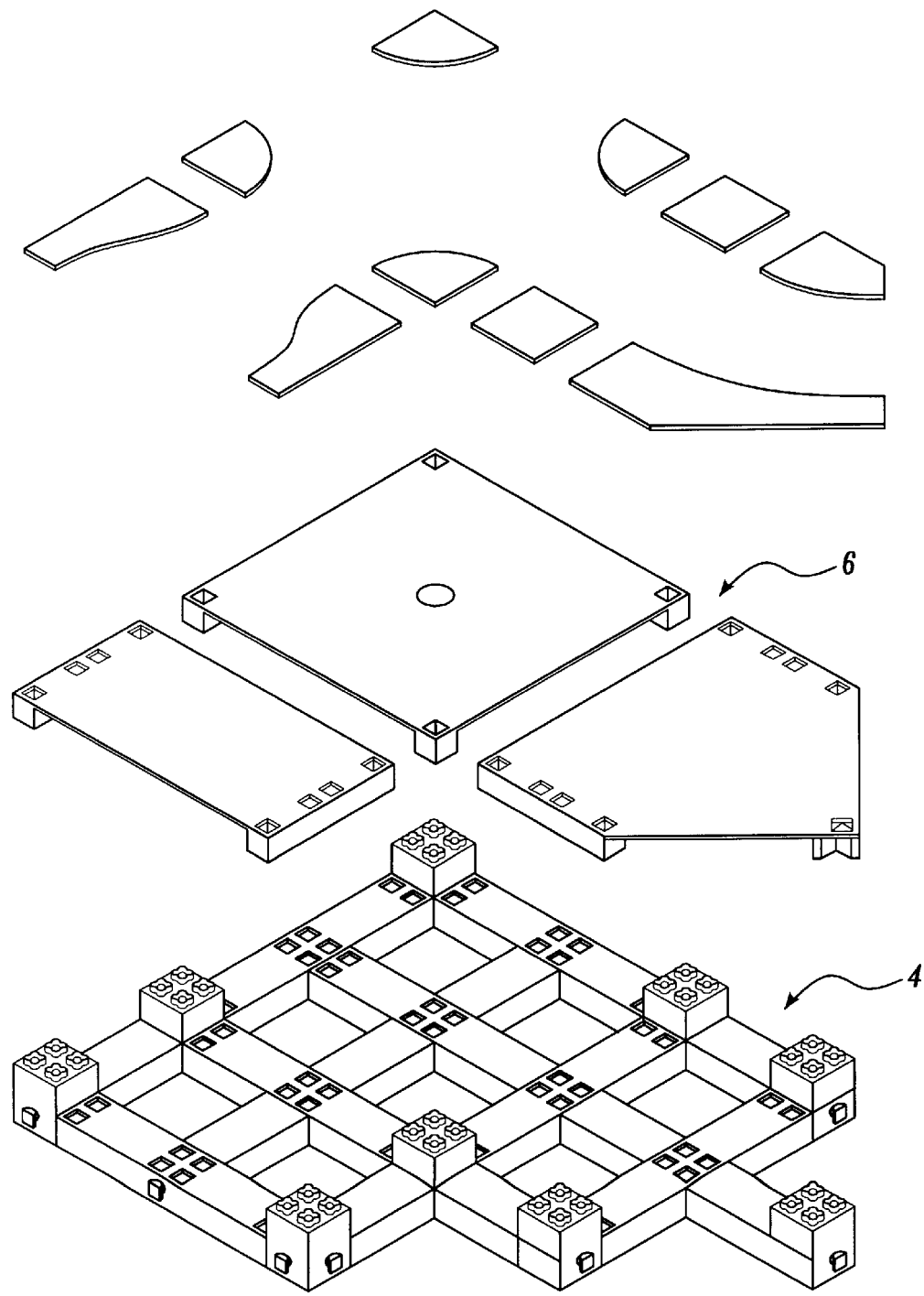
FIG. 3 is an exploded isometric view of the lattice and base of the modular toy building set embodying the present invention.
Figure 4:
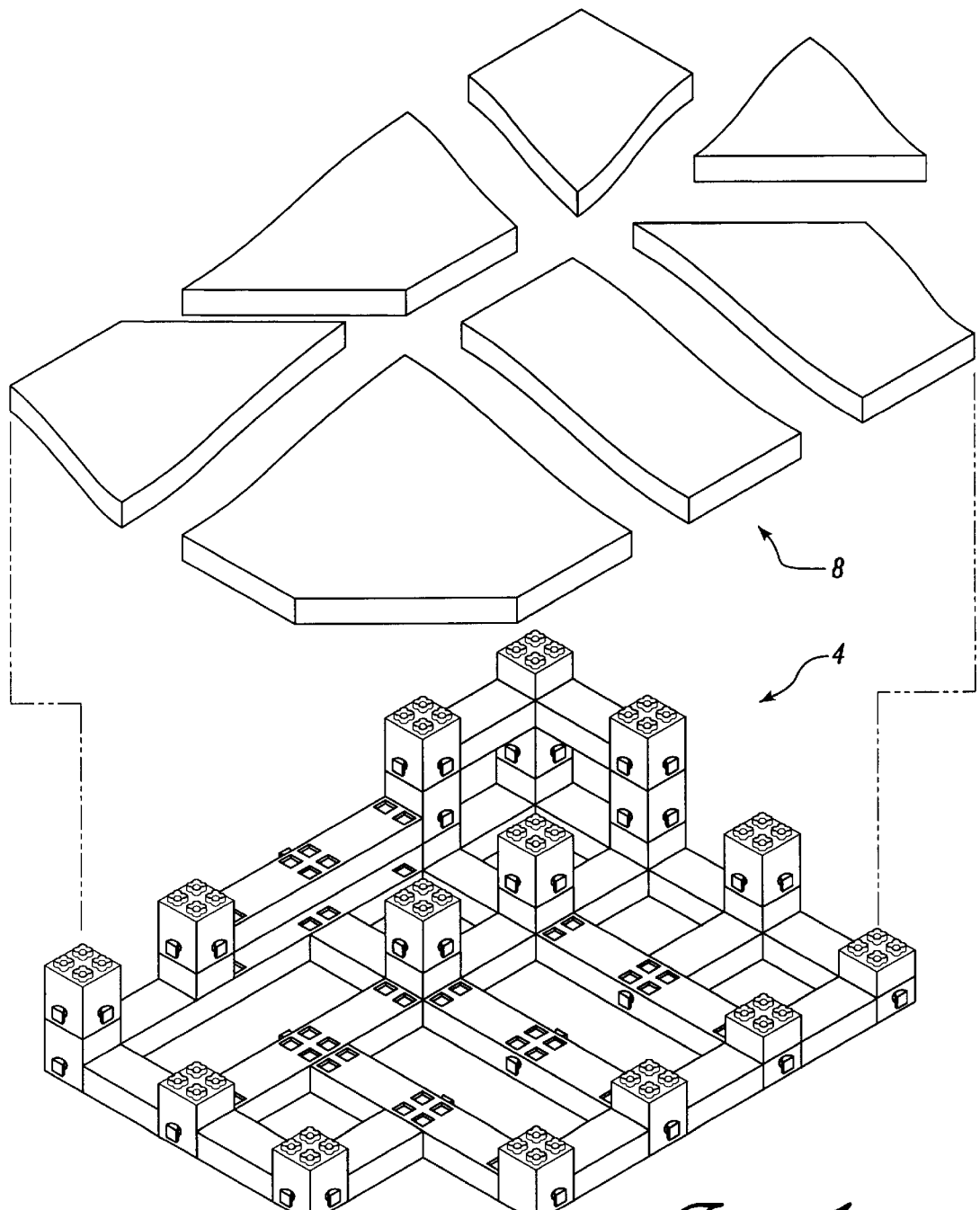
FIG. 4 is an exploded isometric view of the lattice and terrain of the modular toy building set embodying the present invention.

Referring to FIGS. 1–4, modular toy building set 2 generally includes lattice 4, base 6, terrain 8, and playing components 10. More specifically, lattice 4 supports, and is removably attachable to, base 6 as shown in FIG. 3. In turn, base 6 supports, and is removably attachable to playing components 10. Lattice 4 also supports, and is removably attachable to terrain 8, as shown in FIG. 4. The modular aspects of lattice 4, base 6, terrain 8, and playing components 10 allows a multitude of different configurations to be created with modular toy building set 2 while employing the same elements of lattice 4, base 6, terrain 8, and playing components 10. Lattice 4, base 6, terrain 8, and playing components 10 are preferably comprised of a synthetic polymer such as acrylonitrilebutadiene styrene (ABS). This synthetic polymer can be extruded or injection molded to form lattice 4, base 6, terrain 8, and playing components 10.

Figure 5:
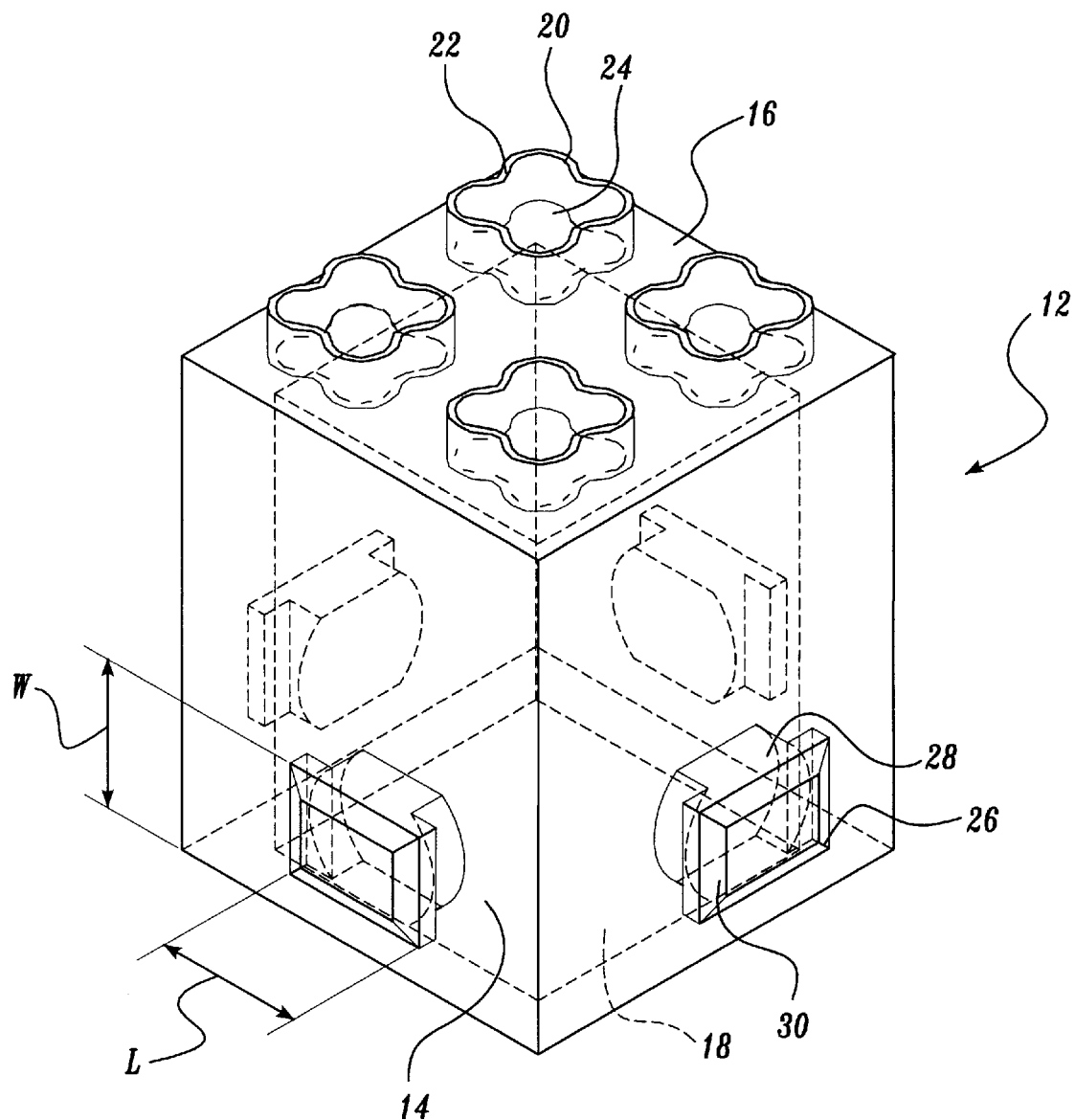
FIG. 5 is a isometric view of the column of the lattice of the modular toy building set embodying the present invention.

Referring to FIG. 5, column 12 of lattice 4 is shown in detail. Column 12 is substantially cubic in shape, but preferably has a height slightly greater than its width. Column 12 has four sides 14, a top 16, and a bottom 18. Male fittings 20 are preferably located on top 16 of column 12. Each male fitting 20 has a peripheral wall 22 and a center recess 24. Additionally, while male fittings 20 are shown on top 16 of column 12, male fittings 20 could, instead, be female fittings provided that the component to which top 16 of column 12 is to be attached has the appropriate mating fitting thereon. Similarly, as discussed throughout the rest of this description, wherever a female fitting (or conversely male fitting) is mentioned, a male fitting (or conversely a female fitting) can be employed in its stead as long as complementary fittings are present on components to be removably attached. Bottom 18 of column 12 preferably has a plurality of female fittings in the same configuration and orientation as the male fittings 20 on top 16 of column 12. The male fittings 20 on top 16 and the female fittings on bottom 18 of column 12 allow for secure, removable vertical stacking of a plurality of columns 12, as shown in FIG. 4, in order to vary the height of lattice 4. While male fittings 20 on top 16 of column 12 are substantially clover leaf in shape, the male fittings discussed herein, as well as the female fittings, can be of any shape that provides removable attachment of two components with a secure connection when attached. Each of sides 14 of column 12 preferably has a protrusion connector 26 thereon. Each protrusion connector 26 has a shaft 28, and a head 30 on the end of shaft 28. Protrusion connectors 26 are sized and shaped to mate with complementary slot connectors on other components in a manner further described below.

Figure 6:
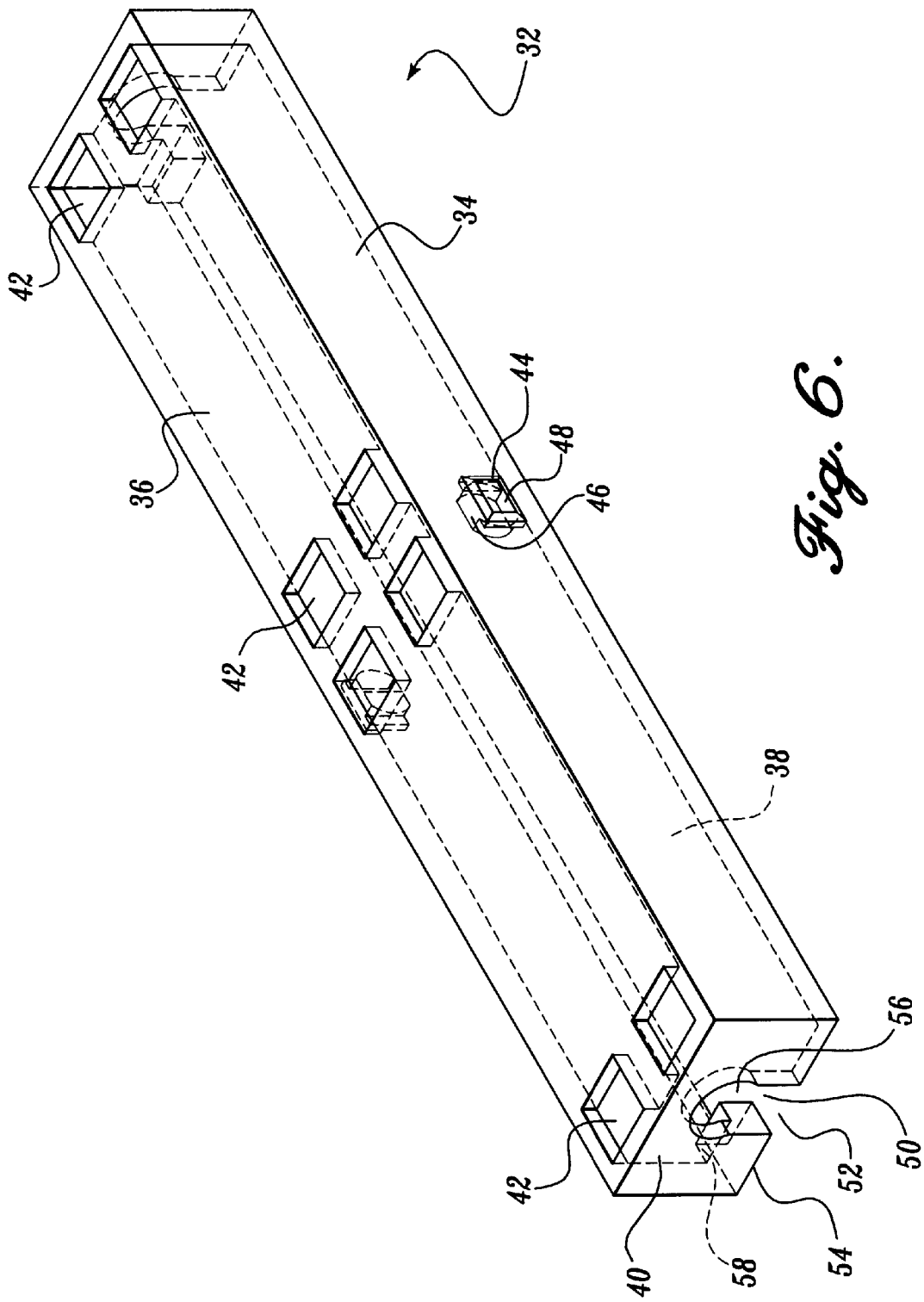
FIG. 6 is a isometric view of the beam of the lattice of the modular toy building set embodying the present invention.

Next, referring to FIG. 6, beam 32 is an elongate preferably rectangular member having sides 34, top 36, bottom 38, and ends 40. Beam 32 preferably has a height less than the height of column 12. Top 36 of beam 32 preferably has a plurality of female fittings 42 thereon. Most preferably, female fittings 42 are located in the center of top 36 and on each end of top 36. Still referring to FIG. 6, female fittings 42 are shown as having a substantially square cross section that has an interference fit with mating male fittings that can, for example, be clover leaf in shape. However, as stated above, female fittings 42 can have other shapes. Female fittings 42 can be employed to removably attach underground roadways 43, as shown in FIG. 1, that are straddled by adjacent columns 12. Underground roadways 43 have mating male fittings on the under surface thereof and allow movement of underground vehicles, or "moles", that guide transport of surface road vehicles by magnetic interconnection.

Again referring to FIG. 6, bottom 38 of beam 32 has a plurality of female fittings thereon such that beam 32 can be supported by columns 12. A protrusion connector 44 is preferably centrally located on each of sides 34 of beam 32. Each protrusion connector 44 has a shaft 46 with a head 48 thereon. Protrusion connector 44 is removably attachable to a slot connector on a component to be removably secured in a manner further described below. Slot connector 50 is located in end 40 of beam 32. Slot connector 50 is an elongate opening having an entrance 52 in lower edge 54 of end 40 of beam 32. Entrance 52 is narrowed in relation to slot terminus 56 such that slot connector 50 can be generally described as being key hole in shape. Beam 32 is preferably at least partially hollow such that head stop 58 can be located within beam 32 adjacent entrance 52 of slot connector 50. Slot connector 50, and other slot connectors described below, while described herein as being an elongate key shaped slot, can generally be a receptive connector of any shape matable with a complementary protrusion connector.

Figure 7:
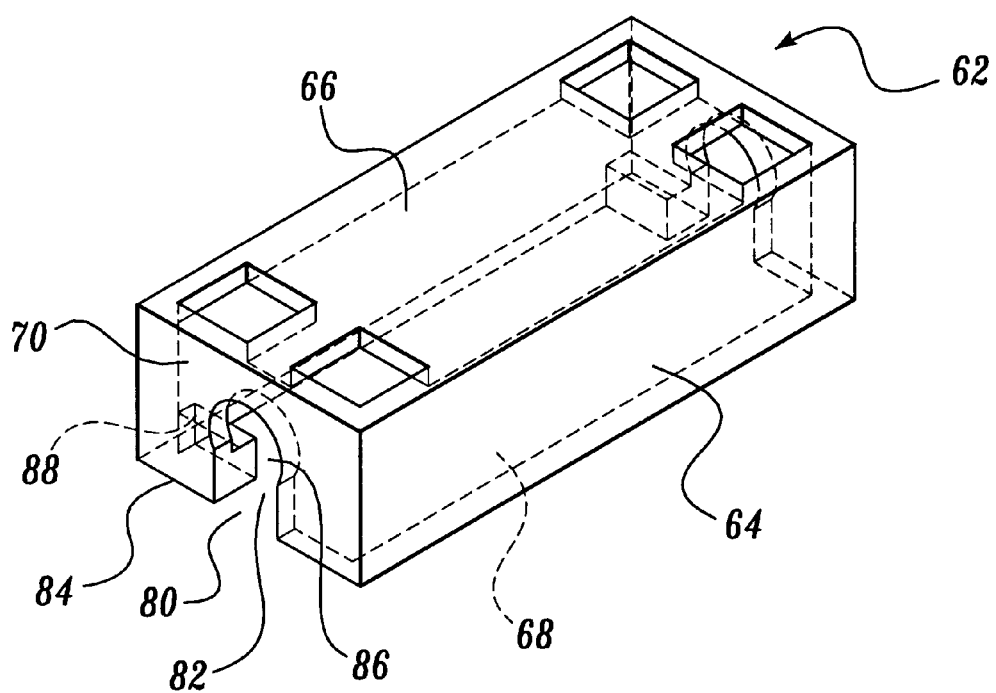
FIG. 7 is a isometric view of the joist of the lattice of the modular toy building set embodying the present invention.

Next, referring to FIG. 7, elongate joist 62 is a preferably rectangular member having a length somewhat less than the length, and preferably less than half the length, of elongate beam 32. Joist 62 is an elongate preferably rectangular member having sides 64, top 66, bottom 68, and ends 70. Joist 62 preferably has a height less than the height of column 12. Bottom 68 of joist 62 has a plurality of female fittings thereon such that joist 62 can be supported by columns 12, other beams, or elongate beams to be described below. Slot connector 80 is located in end 70 of joist 62. Slot connector 80 is an elongate opening having an entrance 82 in lower edge 84 of end 70 of joist 62. Entrance 82 is narrowed in relation to slot terminus 86 such that slot connector 80 can be generally described as being key hole in shape. Joist 62 is preferably at least partially hollow such that head stop 88 can be located in joist 62 adjacent entrance 82 of slot connector 80.

Figure 8:
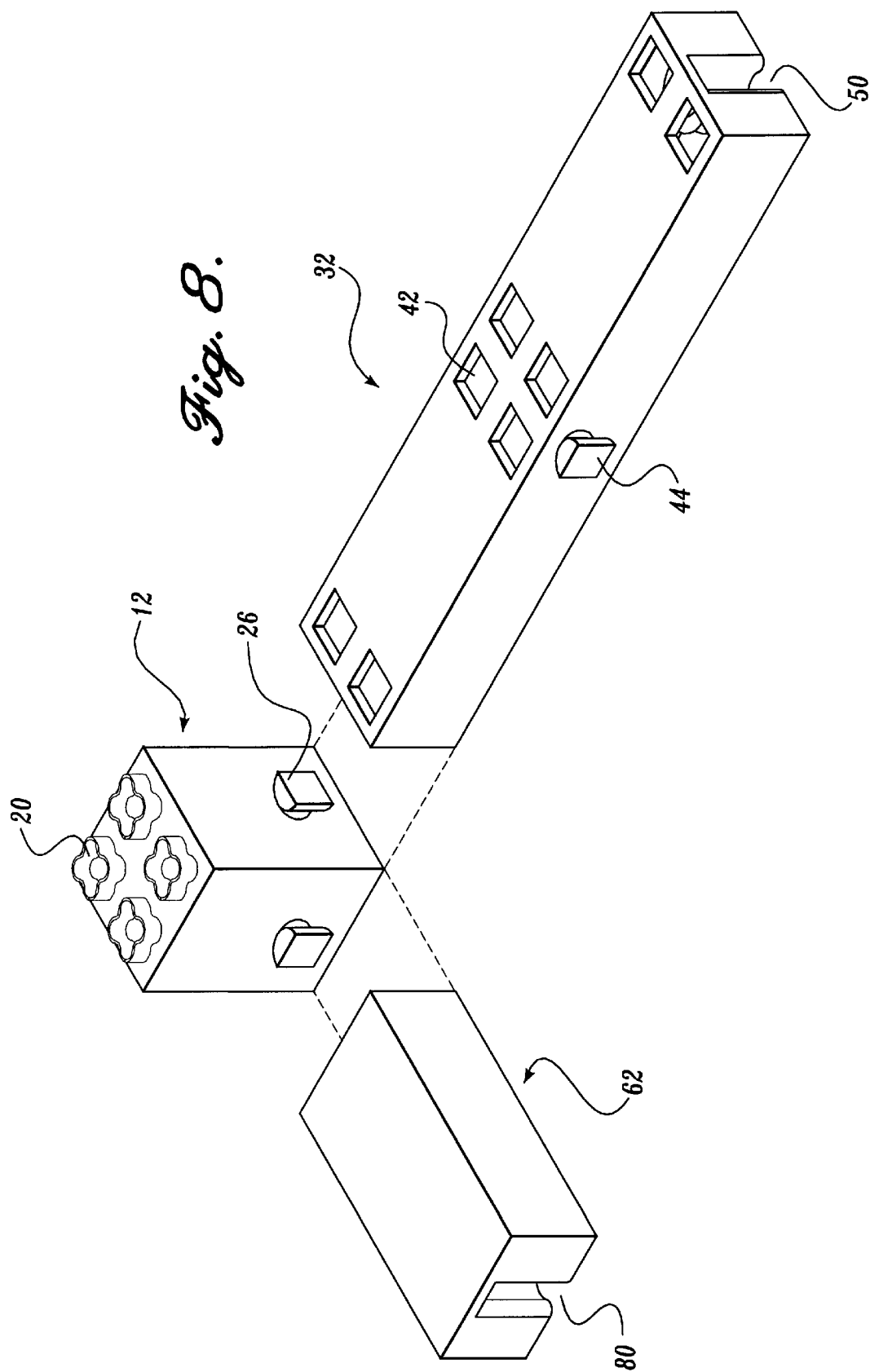
FIG. 8 is an exploded isometric view of the column, beam, and joist of the lattice of the modular toy building set embodying the present invention.
Figure 9:
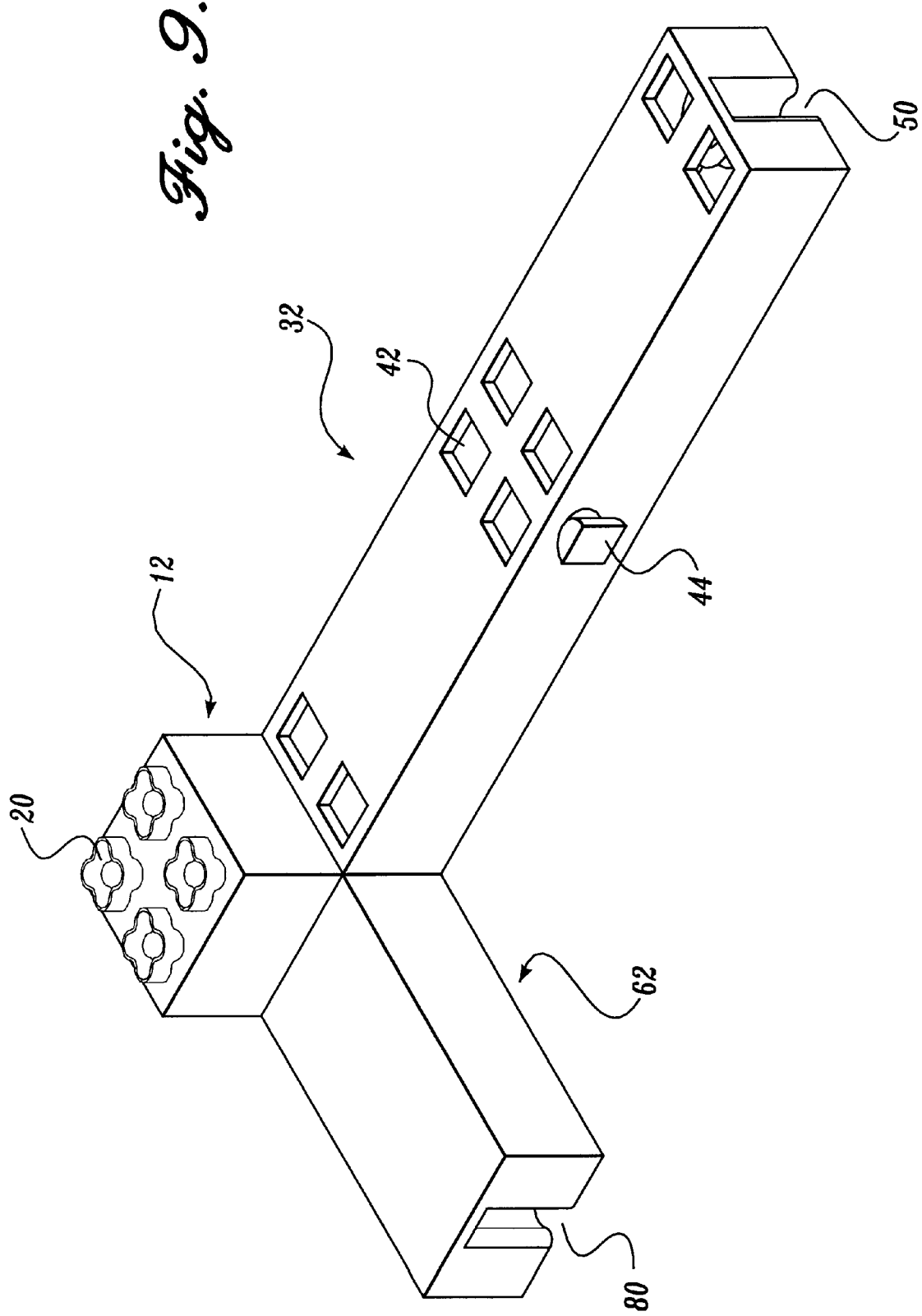
FIG. 9 is an isometric view of the column, beam, and joist of the lattice of the modular toy building set embodying the present invention.

Referring to FIGS. 5, 6, and 7, the interconnection of protrusion connector 26 of column 12 and protrusion connector 44 of beam 32 with slot connector 50 of beam 32 and slot connector 80 of joist 62 is now described in further detail. The interconnection of the above protrusion connectors 26 and 44 with the above slot connectors 50 and 80 is the basis for the removable connection of column 12, beam 32 and joist 62 as shown in FIGS. 8 and 9. In this manner, column 12 can be connected to beam 32 and/or joist 62. Beam 32 can be connected to column 12 and/or joist 62 and joist 62 can be connected to column 12 and/or beam 32. In a first embodiment, head stop 58 of beam 32 and head stop 88 of joist 62 are absent. Head 30 of protrusion connector 26 of column 12 and head 48 of protrusion connector 44 of beam 32 both have a width that is greater than the width of entrance 52 and terminus 56 of slot connector 50 of beam 32 and of entrance 82 and terminus 86 of slot connector 80 of joist 62. However, shaft 28 of protrusion connector 26 of column 12 and shaft 46 of protrusion connector 44 of beam 32 both have a width that is less than the width of entrance 52 and terminus 56 of slot connector 50 of beam 32 and of entrance 82 and terminus 86 of slot connector 80 of joist 62. Based on the above configurations, column 12 can be removably attached to beam 32 or joist 62 and beam 32 can be removably attached to another beam 32 or joist 62 by sliding shaft 28 of protrusion connector 26 of column 12 or shaft 46 of protrusion connector 44 of beam 32 through entrance 52 of slot connector 50 of beam 32 or entrance 82 of slot connector 80 of joist 62 in a direction orthogonal (e.g., upwardly) to the longitudinal axis of beam 32 or joist 62. Because the width of head 30 of protrusion connector 26 of column 12 and of head 48 of protrusion connector 44 of beam 32 is greater than the width of entrance 52 and terminus 56 of slot connector 50 of beam 32 and of entrance 82 and terminus 86 of slot connector 80 of joist 62, the beam 32 or joist 62 cannot be removed from column 12 or other beam 32 or joist 62 by pulling beam 32 or joist 62 along the longitudinal axis thereof.

In another embodiment, head stop 58 of beam 32 and head stop 88 of joist 62 are present. Additionally, as shown in FIGS. 5 and 6, head 30 of protrusion connector 26 of column 12 and head 48 of protrusion connector 44 of beam 32 both have a length "l" that is greater than the width of entrance 52 and terminus 56 of slot connector 50 of beam 32 and of entrance 82 and terminus 86 of slot connector 80 of joist 62. However, head 30 of protrusion connector 26 of column 12 and head 48 of protrusion connector 44 of beam 32 both have a width "w" less than the width of terminus 56 of slot connector 50 of beam 32 and of terminus 86 of slot connector 80 of joist 62. To removably attach column 12 to beam 32 or joist 62 or to removably attach beam 32 or joist 62 to another beam 32, joist 62 or beam 32 is first axially rotated 90° from the resting configurations shown in FIGS. 5 and 6 such that the width "w" of head 30 of protrusion connector 26 of column 12 or of head 48 of protrusion connector 44 of beam 32 is parallel with the width of entrance 52 and terminus 56 of slot connector 50 of beam 32 or of entrance 82 and terminus 86 of slot connector 80 of joist 62. Head 30 of protrusion connector 26 or head 48 of protrusion connector 44 can thus pass through either entrance 52 and terminus 56 of slot connector 50 or entrance 82 and terminus 86 of slot connector 80. Joist 62 or beam 32 is then rotated 90° back to the resting configuration shown in FIGS. 5 and 6, thus locking column 12 or beam 32 with a beam 32 or a joist 62 since greater length "l" of head 30 of protrusion connector 26 of column 12 or of head 48 of protrusion connector 44 of beam 32 is now parallel with the lesser width of either entrance 52 and terminus 56 of slot connector 50 of beam 32 or entrance 82 and terminus 86 of slot connector 80 of joist 62. Head stop 58 of beam 32 or head stop 88 of joist 62 prevents further rotational movement of head 30 of protrusion connector 26 of column 12 or head 48 of protrusion connector 44 of beam 32.

The above-described modular columns 12, beams 32 and joists 62, having varying heights and lengths, and facilitating both horizontal and vertical interconnection, allow for a multitude of lattice configurations having individual components orthogonally disposed with respect to each other.

Figure 10:
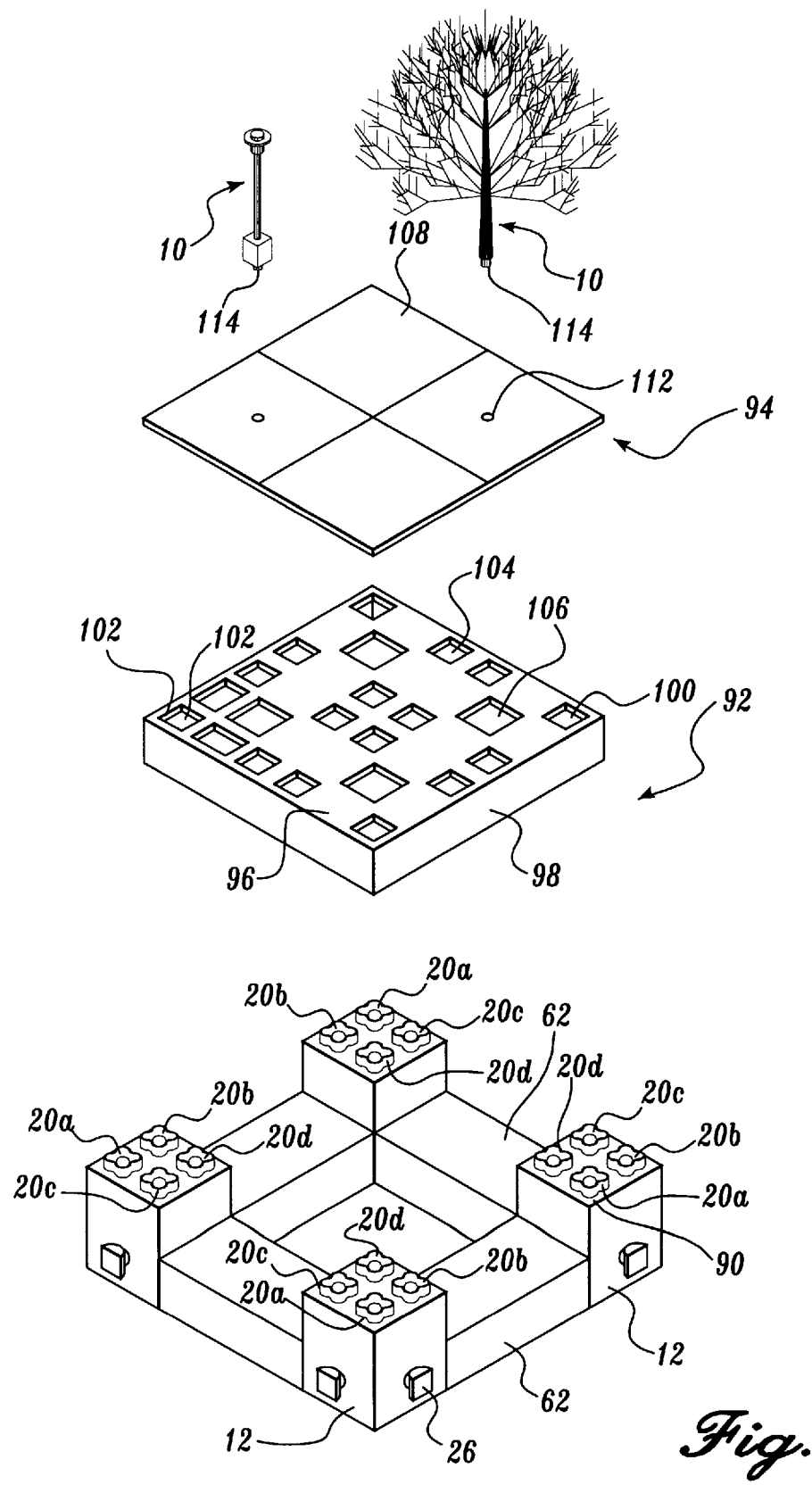
FIG. 10 is an exploded isometric view of the lattice, tile base, tile and playing components of the modular toy building set embodying the present invention.
Figure 11:
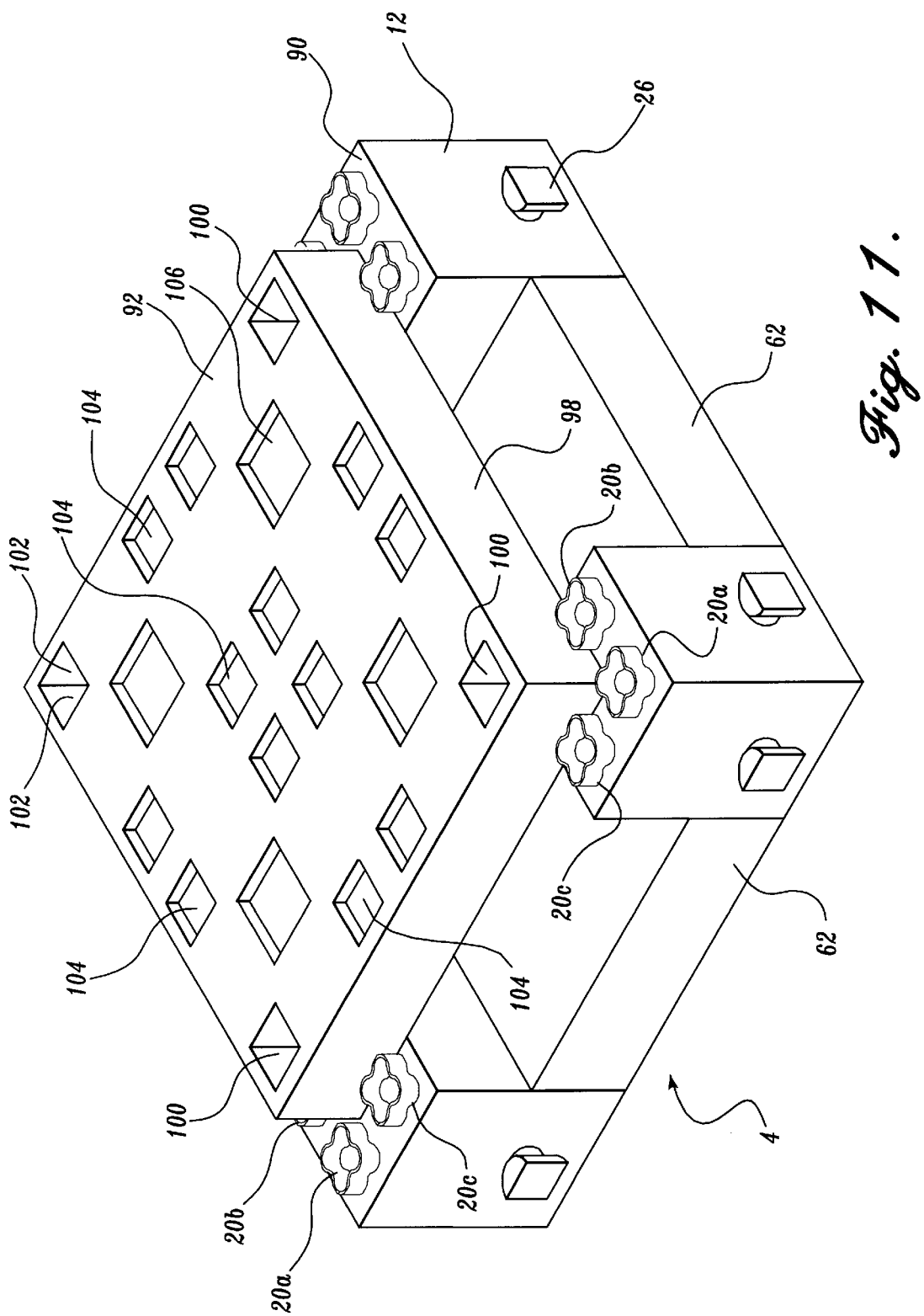
FIG. 11 is an isometric view of the lattice and attached tile base of the modular toy building set embodying the present invention.
Figure 12:
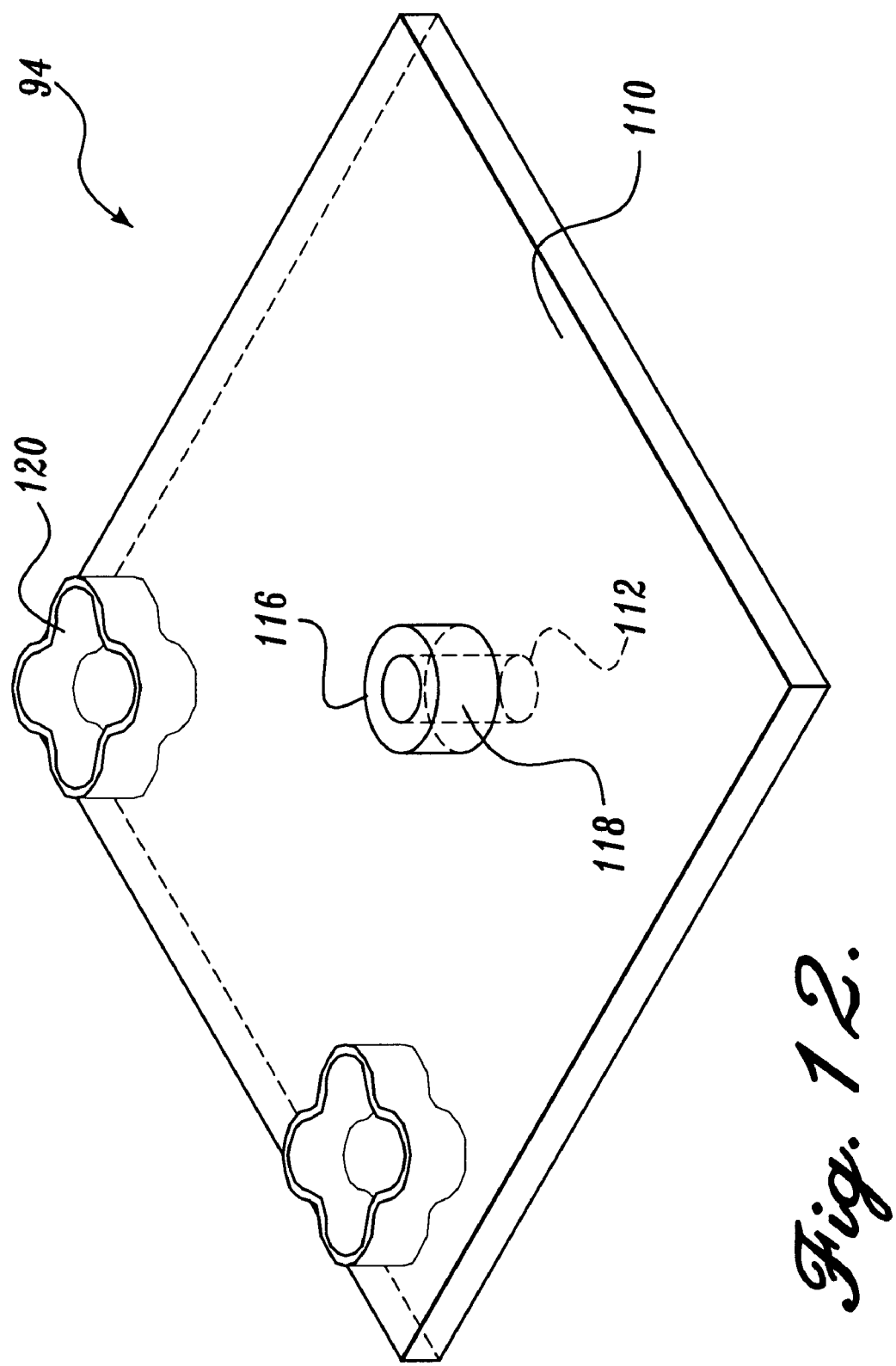
FIG. 12 is an isometric bottom view of the tile of FIG. 10.

Next referring to FIGS. 10–12, base 6 is described in detail. Base 6 is preferably supported on lattice 4, as shown in FIGS. 10 and 11. As previously described, lattice 4 consists of a plurality of columns 12 and orthogonally disposed beams 32 and/or joists 62. While FIGS. 10 and 11 show lattice 4 comprised of only joists 62, lattice 4 can also support base 6 and be comprised of only beams 32 or a combination of beams 32 and joists 62. In these other embodiments, base 6 of different sizes than shown are employed to removably attach to lattice 4. More specifically, if lattice 4 is comprised of four beams 32, base 6 in that embodiment would be both longer and wider than base 6 as shown in FIGS. 10 and 11 due to the greater length of beams 32 as compared to joists 62. Likewise, if lattice 4 is comprised of two beams 32 and two joists 62, base 6 of that embodiment would be elongate relative to base 6 of FIGS. 10 and 11 due to the greater length of beams 32 relative to joists 62. Each column 12 of lattice 4 has an attachment node 90 thereon. Each attachment node 90 has a plurality of attachment fittings thereon, the attachment fittings preferably being four in number and being male fittings 20a, b, c, and d. Each attachment node 90 is preferably located on top 16 of column 12 and the attachment nodes 90 are spaced apart to support base 6 as further described below. Male fittings 20a, b, c, and d on each attachment node 90 are preferably clover leaf in shape, but may be of any shape sized to removably attach to complementary female fittings on base 6 further described below. Additionally, while male fittings 20a, b, c, and d are shown on attachment nodes 90 and complementary female fittings are shown on base 6, it is understood that at this assembly point of the invention, and all other assembly points disclosed herein, male fittings and female fittings can be switched to be on opposite components.

Base 6 is preferably comprised of tile base 92, a first planar member, which is removably attachable to tile 94, a second planar member. Tile base 92 is preferably a parallelogram having a top 96 and exterior edges 98. Adjacent the four corners of tile base 92 are channels 100. Channels 100 have interior walls 102 orthogonal to top 96 of tile base 92. Thus, the portion of channels 100 under tile base 92 defined by the lower portion of edges 98 and interior walls 102 create a female fitting matable with male fitting 20d on attachment node 90 of lattice 4. The ends of channels 100 of tile base 92 located adjacent top 96 of tile base 92 define female fittings that are sized to interference fit with attachment fittings on tile 94, further described below. Channels 100 are preferably square in cross section. Tile base 92 also can have a plurality of additional female fittings 104, also preferably square, in top 96 sized and oriented to removably interference fit with male fittings on tile 94, discussed further below. Collar orifices 106 are also located in top 96 of tile base 92. Collar orifices 106 are oriented and sized to retain protrusions, or collars, present on the underside of tile 94, described further below.

Innermost male fittings 20d that are closest to the center of lattice 4 removably interference fit with edges 98 and interior walls 102 that bound channels 100 on the underside of tile base 92. As specifically shown in FIG. 11, tile base 92 is thus preferably sized such that additional tile bases 92 are removably attachable to the non-innermost of male fittings, i.e., male fittings 20a, 20b, and 20c of attachment nodes 90. In this manner, planar member 92 is attachable to the central portion of lattice 4 and preferably eight additional tile bases 92 can be attached to the periphery of lattice 4 at male fittings 20a, 20b, and 20c. More specifically, two additional tile bases 92 can each attach to two male fittings 20b, one each on opposite sides of lattice 4. Two tile bases can attach to male fittings 20c, one each on opposite sides of lattice 4 that are perpendicular to the sides of lattice 4 supporting the additional tile bases 92 mating with male fittings 20b. Four additional tile bases 92 can each attach to one of male fittings 20a, such that one tile base 92 attaches to each of the four attachment nodes 90 of lattice 4. These peripherally attached tile bases 92 are preferably also supported by other lattices 4 interconnected with lattice 4 shown in FIGS. 10 and 11.

Next referring to FIGS. 10 and 12, tile 94 is preferably a planar member having a top 108, a bottom 110. Tile 94 can have one or more playing component openings 112 matable with playing component protrusions 114 on playing components 10. Playing component openings 112 preferably pass entirely through tile 94. Collar 116 having collar opening 118 is preferably located on bottom 110 of tile 94. Collar opening 118 is coaxially aligned with playing component opening 112 that preferably passes entirely through tile 94. In this manner, playing component protrusion 114 of playing component 10 can be braced within collar 116 for added stability. Collar 116 is oriented on bottom 110 of tile 94 to reside within one of collar orifices 106 on top 96 of tile base 92 for a low profile fit between tile base 92 and tile 94. Male fittings 120 are located on bottom 110 of tile 94. Male fittings 120 are preferably clover leaf in shape and are sized to removably interference fit with the upper portion of channels 100 adjacent top 96 that define female fittings located at the corners of tile base 92. Male fittings 120 of tile 94 also removably interface fit with female fittings 104 on top 96 of tile base 92 for removable attachment of tile base 92 and tile 94. Tile 94 can cover all of top 96 of tile base 92 when tile 94 is to portray a section of grass, earth, water, or pavement that has a unitary depth. However, when a varied depth is desired, such as when a road, street, river bank, or lake shore is being portrayed, as shown in FIG. 1, tile 94 can cover only a portion of tile base 92 such that tile 94 can portray a sidewalk, green belt, river bank, or lake edge having a height greater than the street, road, river, or lake depicted by the exposed portion of tile base 92.

Next referring to FIGS. 13–16, modular buildings 122 are described in detail. Modular buildings 122 are removably attachable to tile base 92, as shown in FIGS. 1 and 2 and as described in further detail below. As shown in FIGS. 13–16, modular buildings 122 are comprised of foundations 124, wall members 126 and couplers 128. Foundations 124 are preferably substantially planar members having a top 130, a bottom 132 and edges 134. Each foundation 124 has a raised rib 136 on top 130. Preferably, four raised ribs 136 are present and are disposed substantially perpendicularly to one another in a substantially cross-shaped configuration. Preferably, the cross-shaped configuration of raised ribs 136 divides top 130 of foundation 124 into quadrants 130a, 130b, 130c and 130d. Each raised rib 136 preferably has beveled edges 138 that extend outward from top 130 of foundation 124 such that top 140 of raised rib 136 has a greater surface area than does the underside of raised rib 136 that is in contact with top 130 of foundation 124.

Figure 17:
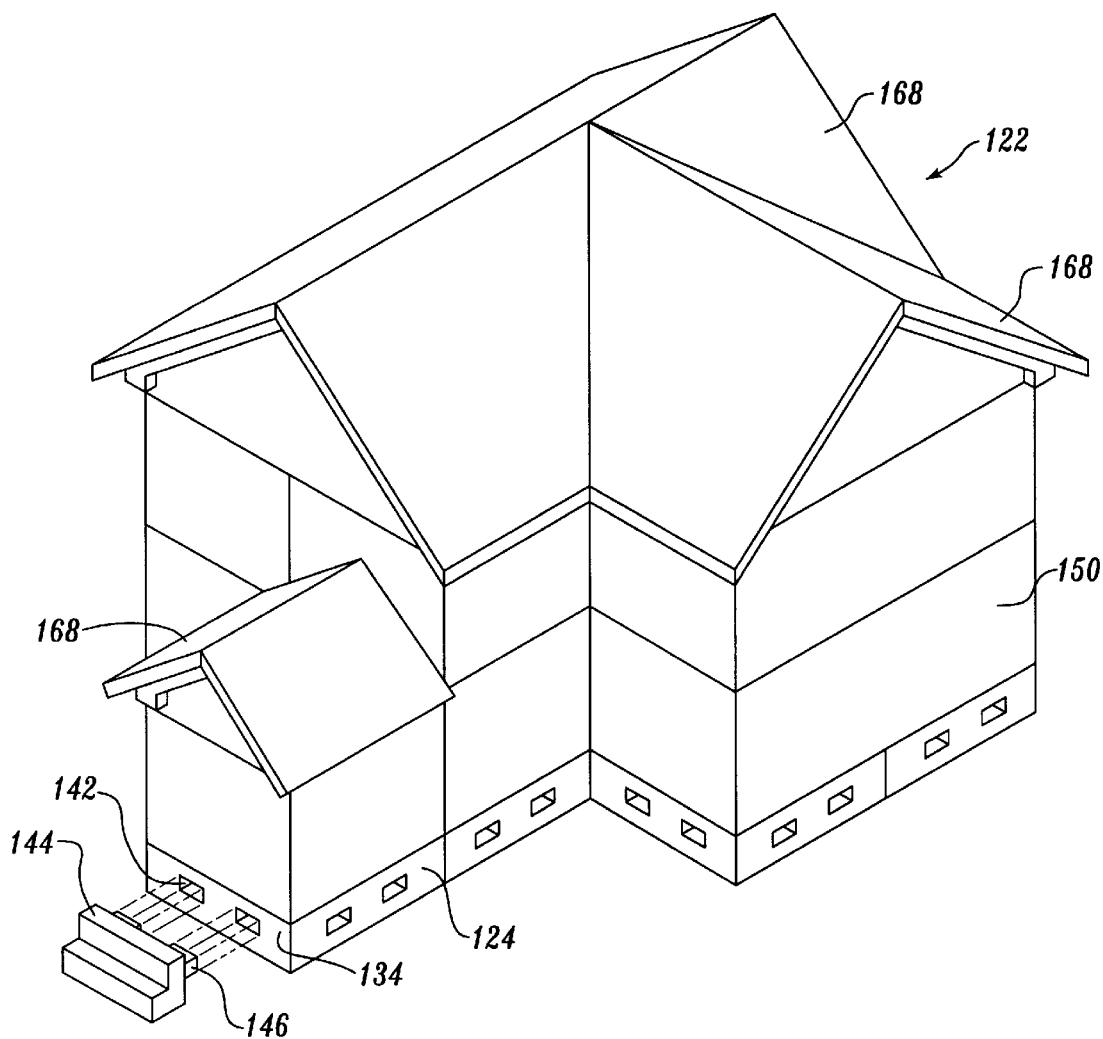
FIG. 17 is an isometric view of a two-story modular building of the modular toy building set embodying the present invention.

Female fittings 142 are located on edges 134 of foundation 124. Female fittings 142 can be male fittings as long as the component to be attached to edges 134 of foundation 124 has complementary fittings thereon. Likewise, where female (or male) fittings are described herein, the complementary fitting, (male) or (female) can be employed instead as long as a mating fitting is present on the component to which the described structure is to be attached. As shown in FIG. 17, building subassembly 144 which can be, for example, steps, has male fittings 146 thereon that are matable with female fittings 142 of edges 134 of foundation 124 for attachment of building subassembly 144 to foundation 124.

Figure 15:
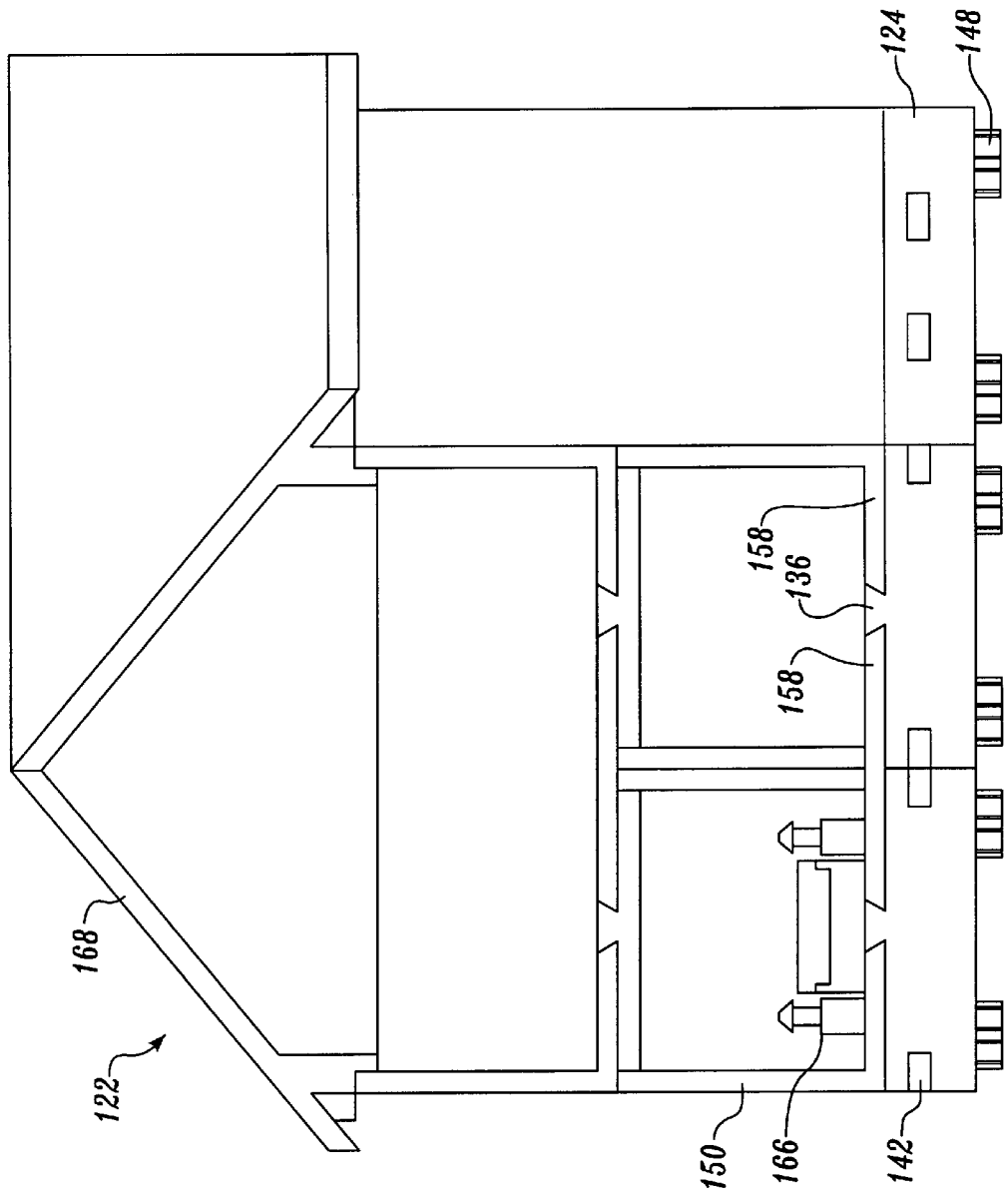
FIG. 15 is a partially exposed view of a modular building of the modular toy building set embodying the present invention.

Bottom 132 of foundation 124 has a plurality of male fittings 148 thereon, as shown in FIG. 15. Male fittings 148 are preferably clover leaf in shape and are sized and aligned to fit in the portion of channel 100 adjacent top 96 of tile base 92 and in female fittings 104 of tile base 92 to removably attach foundation 124, and modular building 122, to tile base 92.

Figure 13:
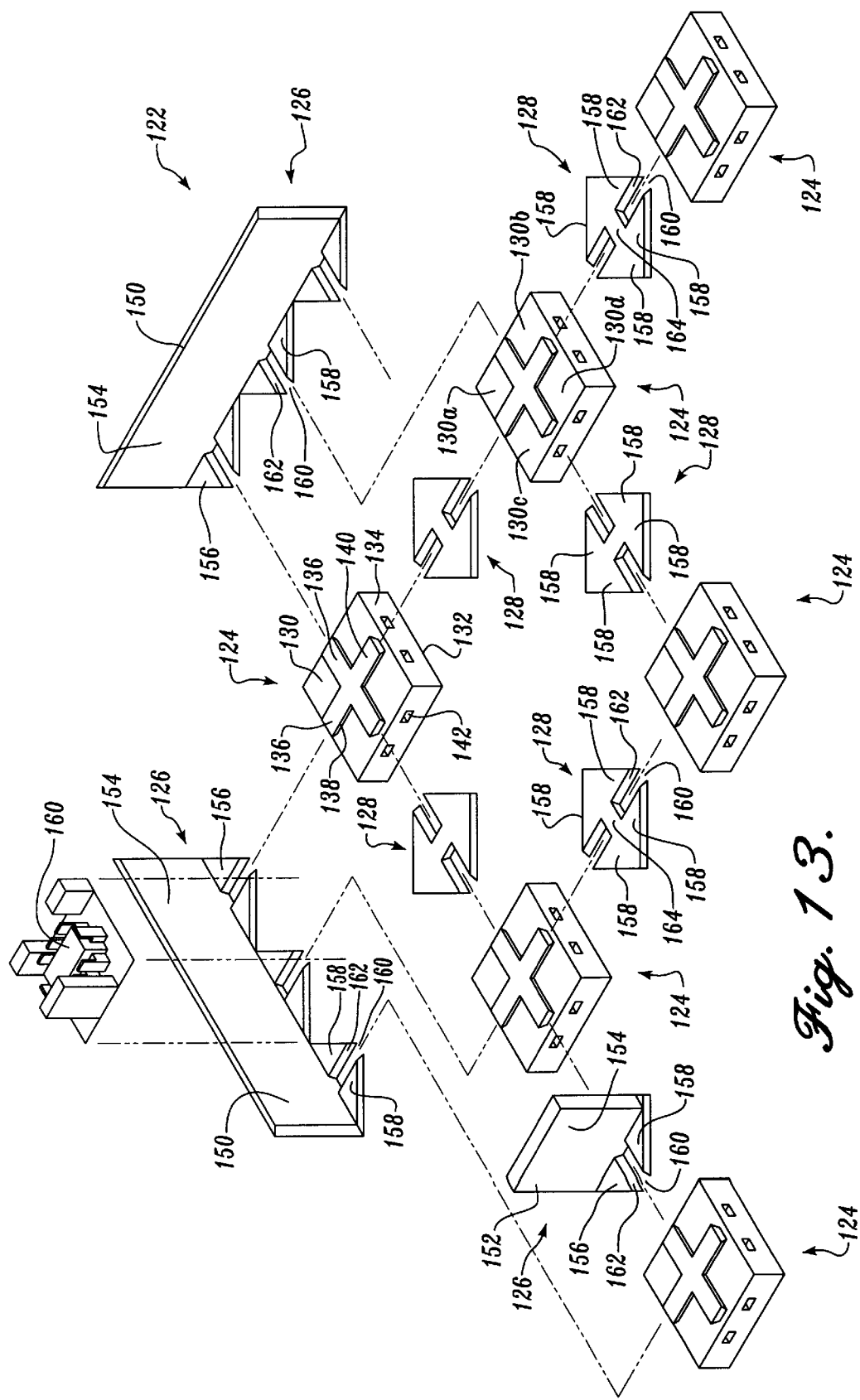
FIG. 13 is an exploded isometric view of a modular building of the modular toy building set embodying the present invention.
Figure 14:
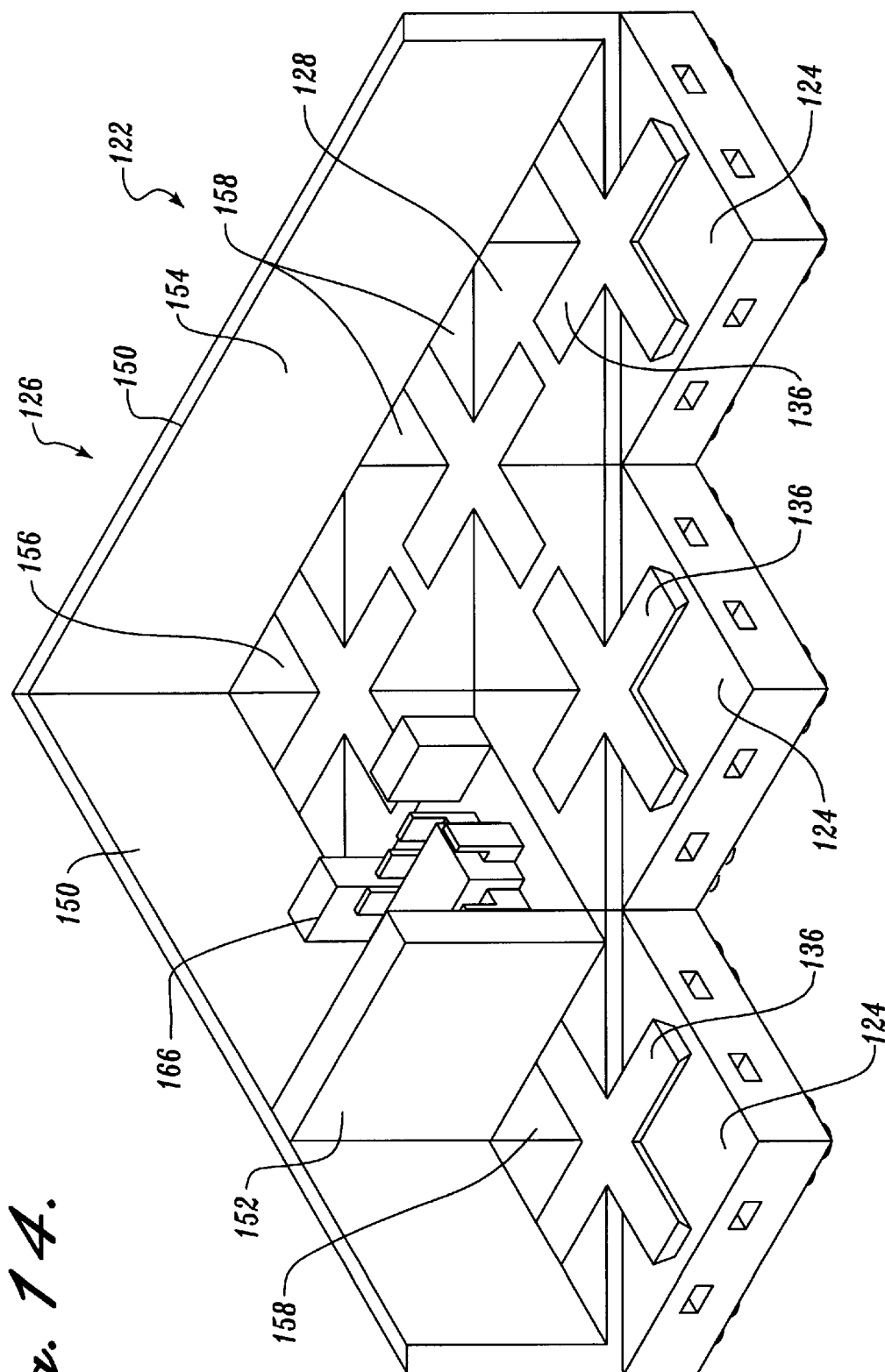
FIG. 14 is an isometric view of a modular building of the modular toy building set embodying the present invention.

Referring to FIGS. 13 and 14, wall members 126 can either be exterior wall members 150 or interior wall members 152. Exterior wall members 150 form the external perimeter of modular building 122 while interior wall members 152 divide modular building 122 into cubicles or rooms, and can have doors or other openings therein. Wall members 126 are comprised of a wall portion 154 that is substantially orthogonally disposed to foundation 124, and a base portion 156 which is substantially parallel to foundation 124 when wall member 126 is attached to foundation 124. Exterior wall members 150 have base portions 156 located on only one side of wall portion 154 while interior wall members 152 have base portions 156 located on both sides of wall portion 154. Each base portion 156 is comprised of a pair of wings 158 that are preferably triangular in shape and are separated by a cleft 160. The edge 162 of each wing 158 bordering cleft 160 is beveled at an angle complementary to the angle of beveled edges 138 of raised ribs 136 of foundation 124.

Similarly, each coupler 128, which is employed to join two foundations 124 without a wall separating the two foundations 124, also includes cleft 160 separating wings 158. More specifically, each coupler 128 includes two pair of wings 158, with one pair of wings 158 joined to the other pair of wings 158 by spine 164. Each pair of wings 158 is spaced by a cleft 160. Each of wings 158 have edges 162 adjacent cleft 160 that are beveled at an angle complementary to beveled edges 138 of raised rib 136 of foundation 124.

To removably interconnect a plurality of foundations 124, wall members 126 and couplers 128, raised ribs 136 of foundations 124 are slid into clefts 160 of base portions 156 of wall members 126 or into clefts 160 of couplers 128. As best shown in FIGS. 13 and 14, each wing 158 of a coupler 128 or of a base portion 156 of a wall member 126 will occupy one half of one of quadrants 130a, 130b, 130c, or 130d of top 130 of foundation 124. Thus, adjacent wings 158 of adjacent couplers 128 or adjacent base portions 156 of wall members 126 can abut to seamlessly and completely occupy one of quadrants 130a, 130b, 130c, or 130d of top 130 of foundation 124. Because, the height of wings 158 of couplers 128 and of base portions 156 of wall members 126 are preferably equivalent to the height of raised ribs 136 of foundations 124, a common surface is formed over top 130 of foundation 124 by attachment of foundations 124 with wall members 126 and couplers 128. Modular furnishings 166 can be then placed on top of the seamless surface formed by wings 156 and 158 and raised ribs 136 over top 130 of foundation 124.

Figure 16:
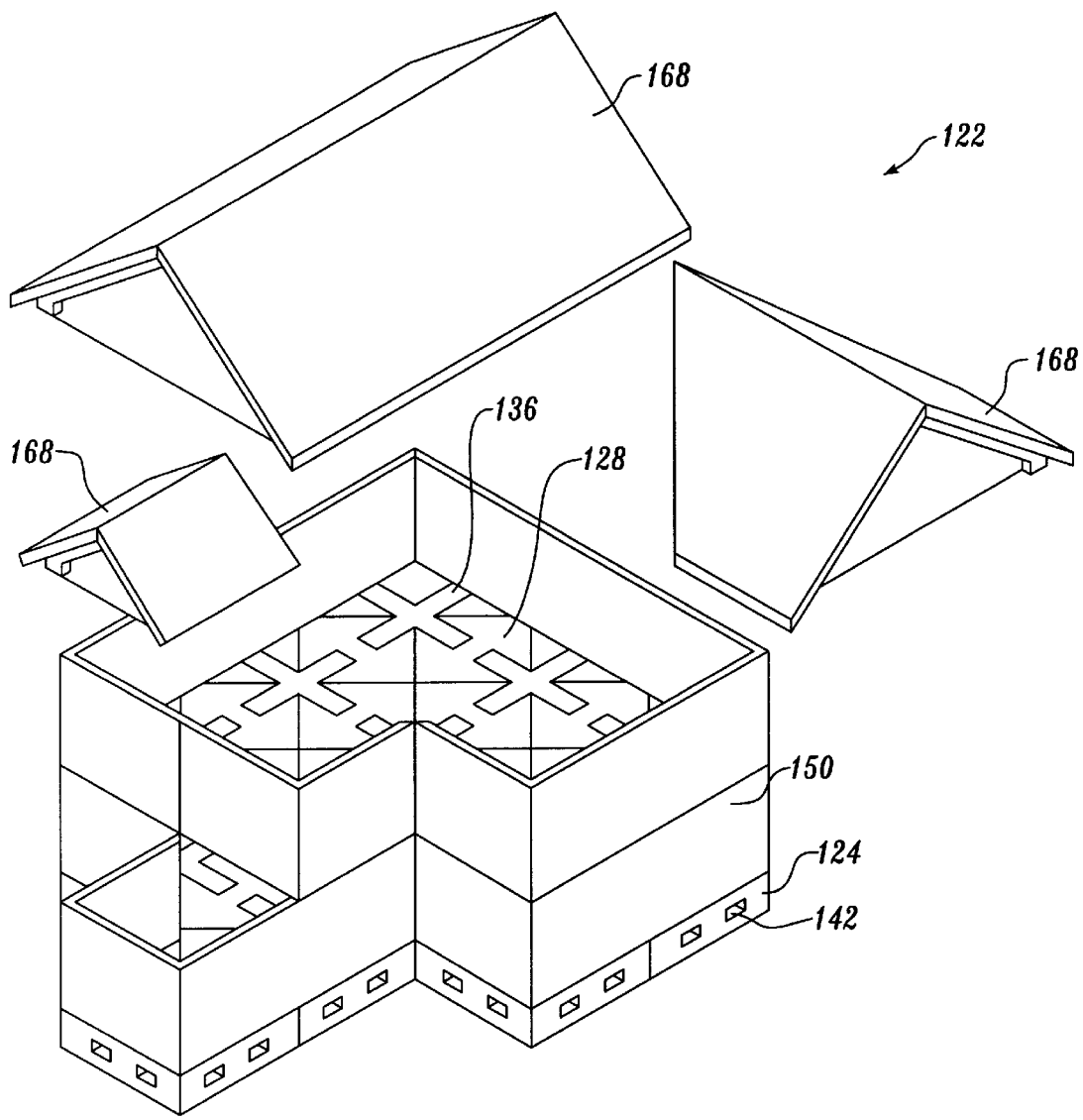
FIG. 16 is an exploded isometric view of a two-story modular building of the modular toy building set embodying the present invention.

As shown in FIG. 16, adjacent exterior wall members 150 can be aligned such that the exterior walls thereof form a 90° angle, 180° angle, or a 270° angle. As shown in FIGS. 15–17, additional floors or stories can be added to a first floor of modular building 122, topped by roof units 168 sized and shaped to cover modular building 122. It is readily apparent from the above description that modular buildings 122 of various shapes, sizes and configurations can be formed employing a plurality of the above modular components including foundations 124, wall members 126, couplers 128, building subassemblies 144, modular furnishings 166 and roof units 168.

Figure 19:
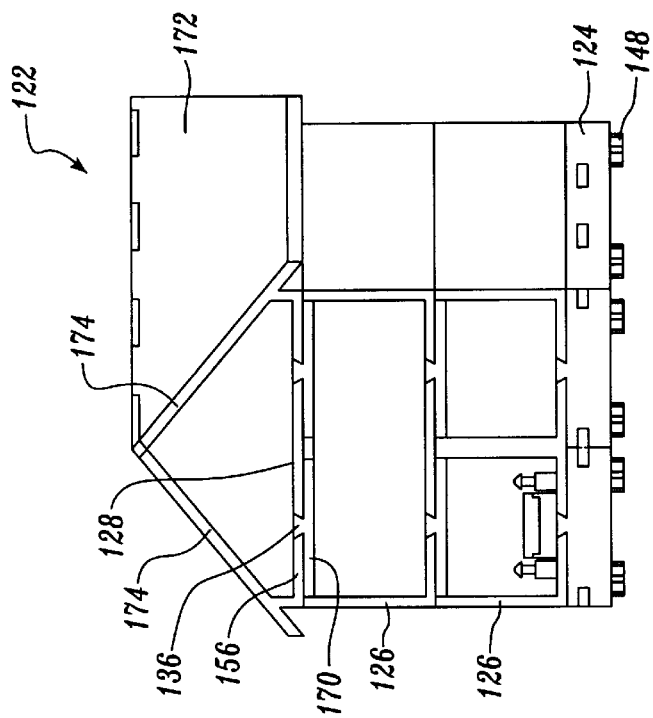
FIG. 19 is a partially exposed view of a modular building of the modular toy building set embodying the present invention.
Figure 18:
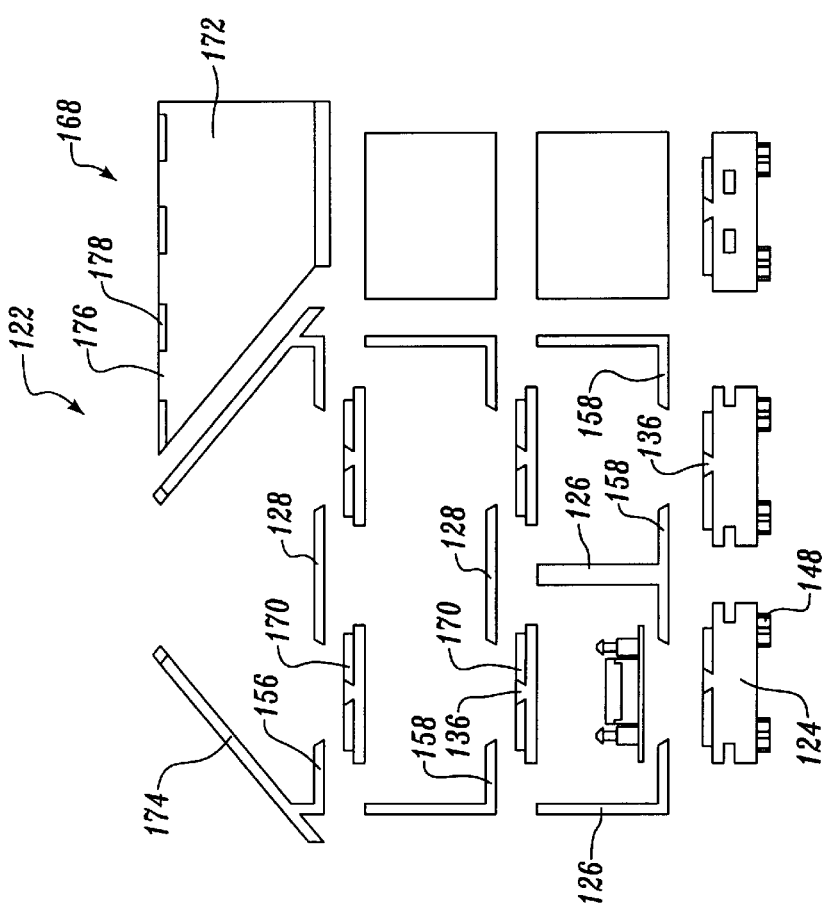
FIG. 18 is a partially exposed exploded view of a modular building of the modular toy building set embodying the present invention.
Figure 21:
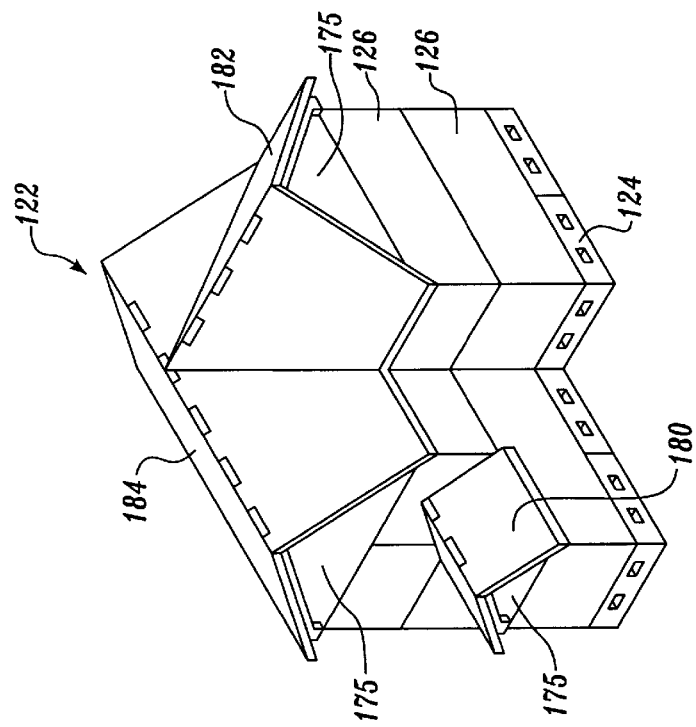
FIG. 21 is an isometric view of the gables and roof foundation on a modular building of the modular toy building set embodying the present invention.
Figure 20:
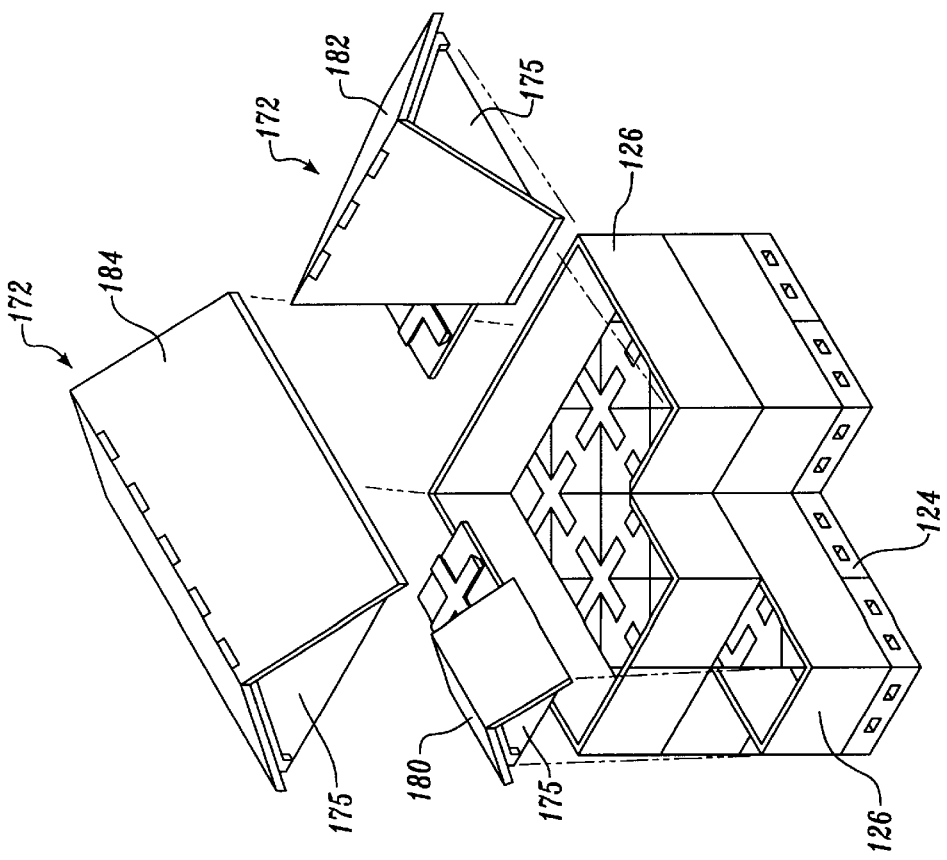
FIG. 20 is a partially exploded isometric view of the gables and roof foundation on a modular building of the modular toy building set embodying the present invention.

Referring to FIGS. 19–25, roof units 168 are described in further detail. It should be noted that roof units 168 include similar components as those used to construct the foundation and walls of modular buildings 122 described above. Where similar components as previously described are employed, the like element numbers are used for consistency. Roof units 168 include foundation 170, couplers 128, gables 172 and end walls 175. Like foundation 124, that is removably attachable to tile base 92, as shown in FIGS. 13–16, foundation 170 is preferably substantially planar and has a top 130. Foundation 170 has a raised rib 136 on top 130. Preferably four raised ribs 136 are present and are disposed substantially perpendicularly to one another in a substantially cross-shaped configuration. However, two raised ribs 136 can be present, disposed so that they are substantially perpendicularly to one another in a T-shaped configuration. Additionally, foundation 170 can be elongated with respect to foundation 124 and can have both a set of four cross-shaped ribs 136 and a pair of T-shaped ribs 136 such that elongate foundation 170 supports a roof extension (i.e., butt gable 180 of FIGS. 20 and 21). When the cross-shaped configuration of raised ribs 136 is present, top 130 divides foundation 170 into four quadrants like quadrants 130a, 130b, 130c and 130d of foundation 124. As with foundation 124, each raised rib 136 of foundation 170 preferably has beveled edges that extend outward from top 130 of foundation 170 such that the top of raised rib 136 has a greater surface area than does the underside of raised rib 136. Unlike foundation 124 described above, foundation 170 does not have female fittings located on its edges for attachment of building subassemblies. Furthermore, foundation 170 does not have a plurality of male fittings on its underside for attachment of foundation 170 to tile base 92. Importantly, foundation 170 is substantially thinner in cross-section than foundation 124. As best shown in FIGS. 18 and 19, foundation 170 is sized and shaped to tolerance fit within the interior dimension of wall members 126 of the story of building 154 immediately under roof unit 168. Still referring to FIGS. 18 and 19, foundation 170 can also be employed as the foundations in stories below roof units 168, but above the first story of buildings 155 which, instead, employ foundations 124 for attachment to tile base 92.

Coupler 128, which has been described above regarding the interconnection of two foundations 124, can also be employed to interconnect two foundations 170. As stated above, coupler 128 includes cleft 160 separating wings 158. More specifically, each coupler 128 includes two pair of wings 158, with one pair of wings 158 joined to the other pair of wings 158 by spline 164. Each pair of wings 158 is spaced by a cleft 160. Each of wings 158 have edges 162 adjacent cleft 160 that are beveled at an angle complementary to the beveled edges of raised rib 136 of foundation 170.

Figure 23:
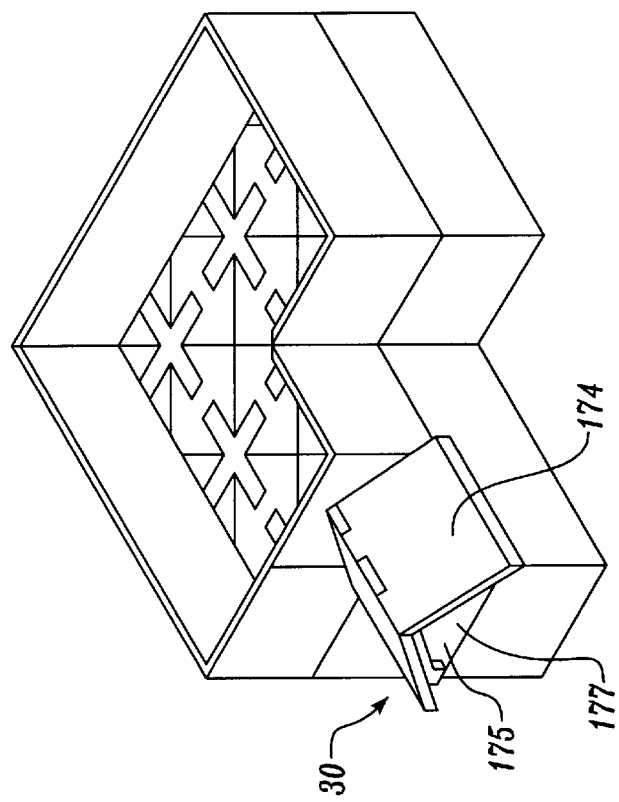
FIG. 23 is an isometric view of the butt gable and associated roof foundation on a modular building of the modular toy building set embodying the present invention.
Figure 22:
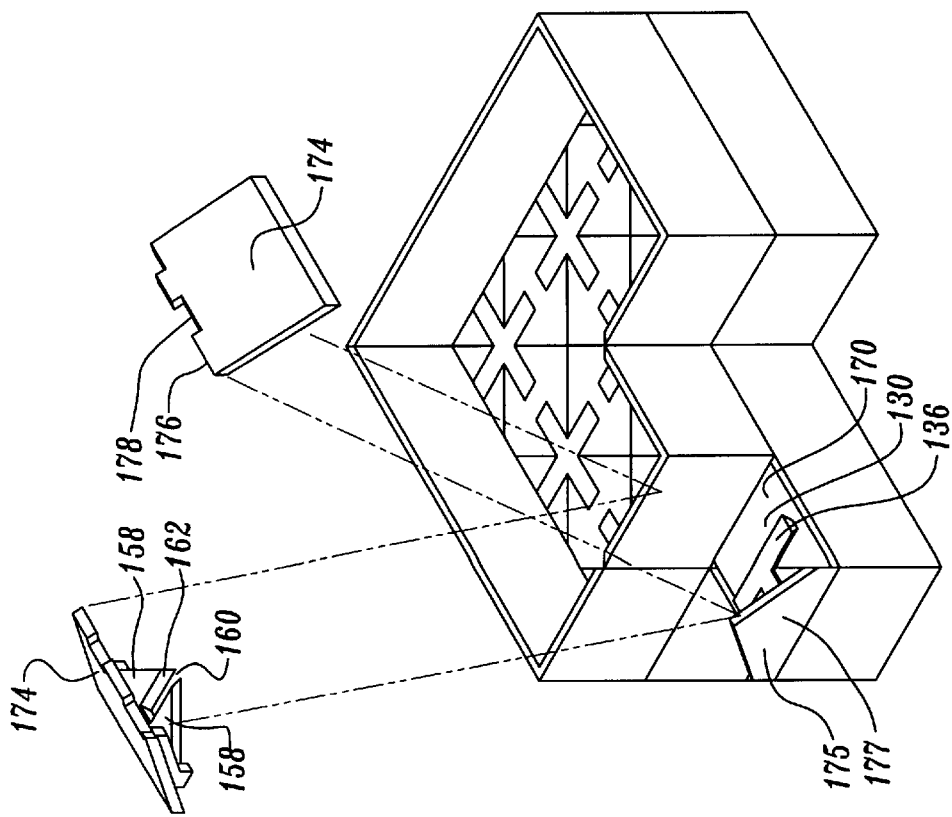
FIG. 22 is a partially exploded isometric view of the butt gable and associated roof foundation on a modular building of the modular toy building set embodying the present invention.
Figure 25:
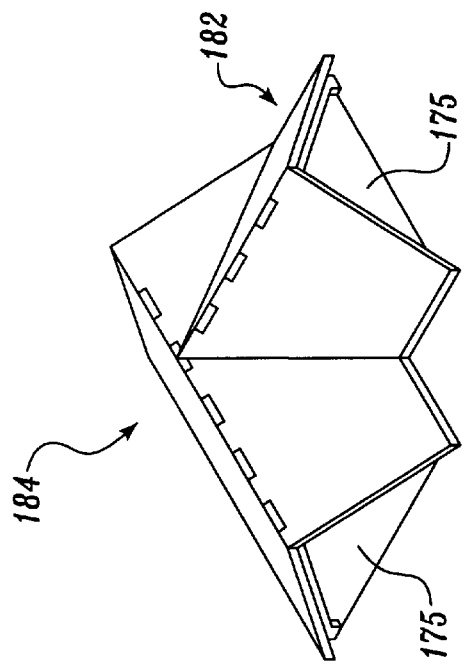
FIG. 25 is a isometric view of the main gable and wing gable and associated roof foundation on a modular building of the modular toy building set embodying the present invention.
Figure 24:
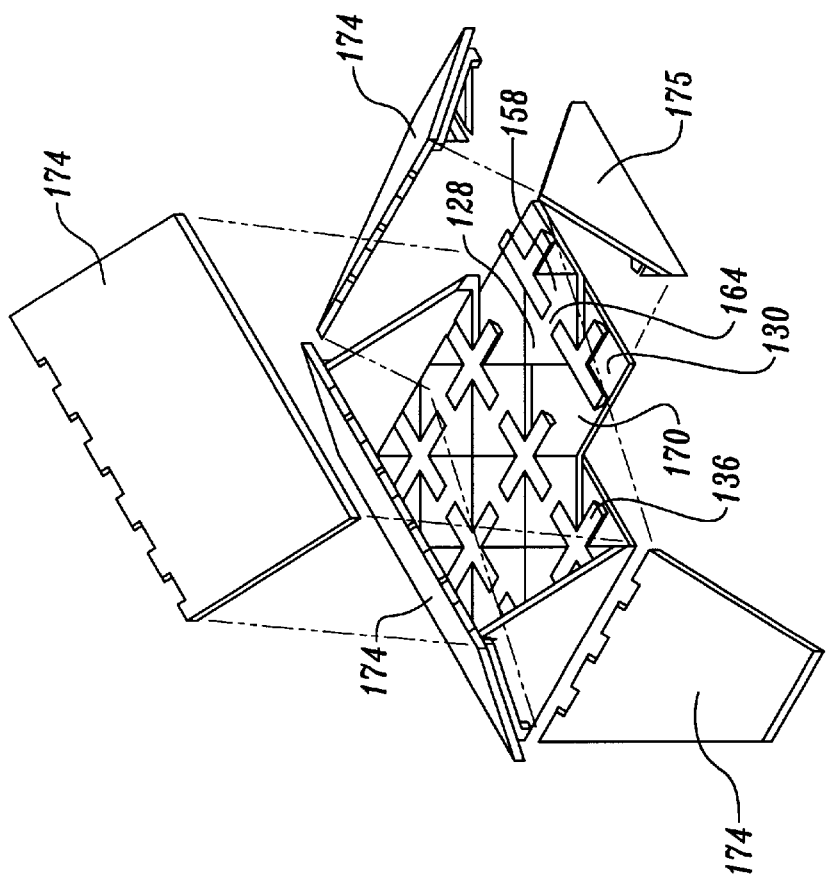
FIG. 24 is a partially exploded isometric view of the main gable and wing gable and associated roof foundation on a modular building of the modular toy building set embodying the present invention.

Gable 172 is removably attachable to foundation 170, and has components similar to the components of wall member 126, described above, that is removably attachable to foundation 124. More particularly, each gable 172 includes a roof portion 174 that is angularly disposed to foundation 170, and a base portion 156 that is substantially parallel to foundation 170 when gable 172 is attached to foundation 170. The elements of base portion 156 of gable 172 are the same as the elements of base portion 156 of wall member 126, described above. More specifically, each base portion 156 is comprised of a pair of wings 158 that are preferably triangular in shape and are separated by a cleft 160. The edge 162 of each wing 158 bordering cleft 160 is beveled at a angle complementary to the angle of the beveled edges of raised ribs 136 of foundation 170. Roof portion 174 of gable 172 includes a plurality of fingers 176 and grooves 178 on its upper edge for interconnection with mating fingers 176 and grooves 178 on another roof portion 174 in mortise and tenon fashion. In this manner, two roof portions 174 of complementary angles form gable 172. Gable 172 can be, for example, a butt gable 180 as shown in FIGS. 22 and 23, or a wing gable 182 or main gable 184 as shown in FIGS. 24 and 25.

End walls 175 include an upper wall portion 177 that is disposed orthogonally to foundation 170, and a base portion 156 that is substantially parallel to foundation 170 when end wall 175 is attached to foundation 170. Upper wall portion 177 is preferably triangular in shape and abuts two joined gables 172 at right angles thereto to complete roof unit 168. Base portion 156 of end wall 175 includes the same components as base portion 156 of gable 172, i.e., a pair of triangular wings 158 with beveled inner edges that are spaced by a cleft 160 for attachment to raised rib 136 of foundation 170.

Figure 26:
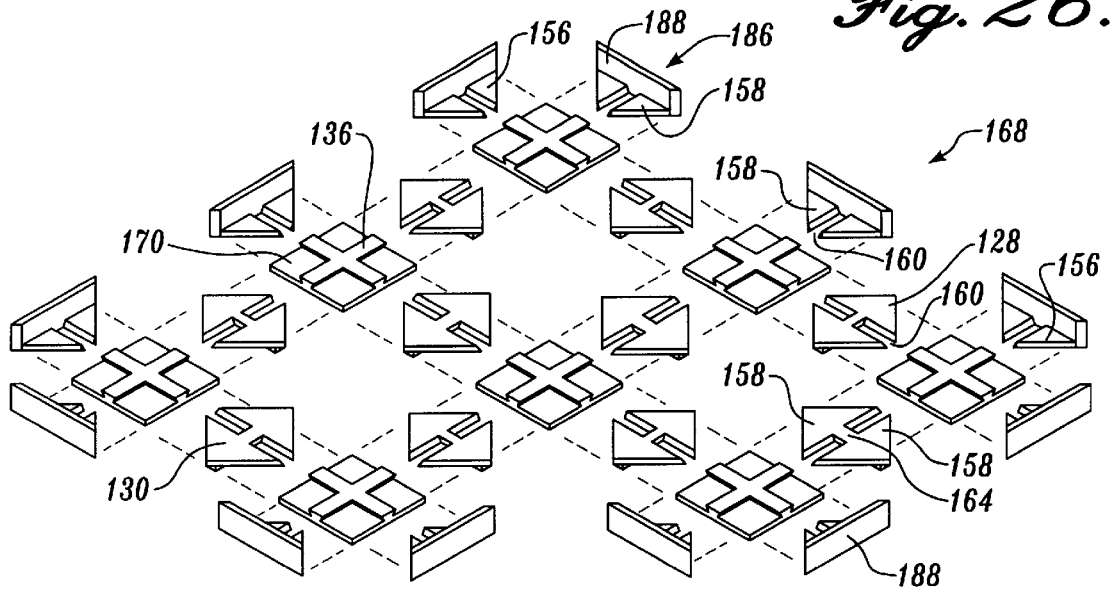
FIG. 26 is an exploded isometric view of a flat roof and associated roof foundation of the modular toy building set embodying the present invention.
Figure 27:
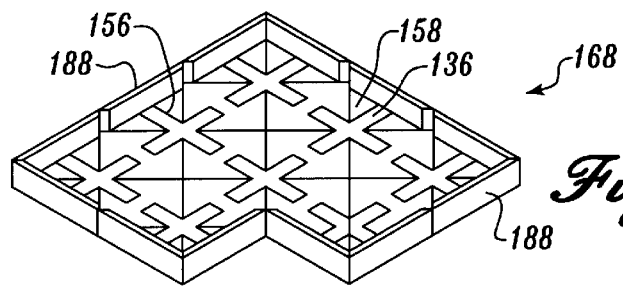
FIG. 27 is an isometric view of a flat roof and associated roof foundation of the modular toy building set embodying the present invention.
Figure 28:
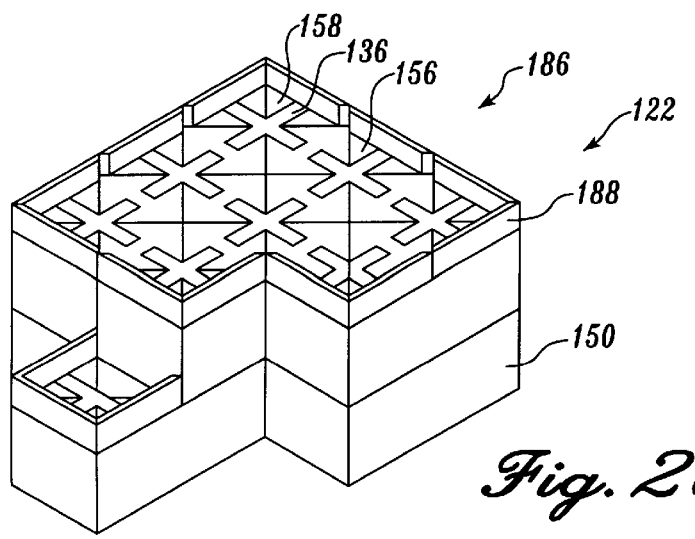
FIG. 28 is an isometric view of a flat roof and associated roof foundation on a modular building of the modular toy building set embodying the present invention.

Referring to FIGS. 26, 27 and 28, roof unit 168 is shown as a flat roof 186 instead of a gable 172. Flat roof 186 is removably attachable to foundation 170, and has components similar to the components of wall member 126, described above, that are removably attachable to foundation 124. More particularly, each flat roof 186 includes a parapet portion 188 that is perpendicularly disposed to foundation 170, and a base portion 156 that is substantially parallel to foundation 170 when flat roof 186 is attached to foundation 170. The elements of base portion 156 of flat roof 186 are the same as the elements of base portion 156 of wall member 126, as described above. More specifically, each base portion 156 is comprised of a pair of wings 158 that are preferably triangular in shape and are separated by a cleft 160. Parapet portion 188 of flat roof 186 is substantially similar to wall portion 154 of wall member 126, except that parapet portion 188 is preferably lesser in height than wall portion 154.

To removably interconnect a plurality of foundations 170 to gables 172 and end walls 175, to flat roofs 186 or to couplers 128, raised ribs 136 of foundations 170 are slid into clefts 160 of base portions 156 of gables 172 and end walls 175, into clefts 160 of base portion 156 of flat roof 186, or into clefts 160 of couplers 128. Preferably, each wing 158 of a coupler 128 or of a base portion 156 of a gable 172, of an end wall 175, or of a flat roof 186 will occupy one half of one of the four quadrants of top 130 of foundation 170. Thus, adjacent wings 158 of adjacent couplers 128 or adjacent base portions 156 of gables 172, end walls 175 or flat roofs 186 can abut to seamlessly and completely occupy one of four quadrants of top 130 of foundation 170.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A modular building for a toy building set comprising:
    a planar member having a top, a bottom and edges, said planar member having at least one raised rib on said top; and
    a second member removably attachable to said planar member, said second member having at least a first planar portion extending substantially orthogonally from said second member, said planar portion having a cleft therein, said cleft sized to receive said rib of said planar member, wherein a total of four of said raised ribs are present, said raised ribs disposed substantially perpendicularly to one another in a substantially cross-shaped configuration.

2. The modular building of claim 1, wherein said raised rib has beveled edges and said cleft has beveled edges complementary to said rib beveled edges.

3. The modular building of claim 1, wherein said cleft is bounded by a pair of wings, said wings being triangular in shape such that one of said wings from each of adjacent second members abut on said planar member when said second member and said planar member are attached.

4. The modular building of claim 3, wherein said raised ribs and said wings are the same thickness such that said top of said planar member has a uniform surface formed by said raised ribs and said wings.

5. The modular building of claim 1, wherein said planar member has attachment fittings on said bottom for removable attachment to a supporting substructure.

6. A modular building of claim 1, wherein said planar member has attachment fittings on said edges for removable attachment to a building subassembly.

7. The modular building of claim 1, further comprising:
    a coupler for attachment of at least two of said planar members, said coupler having at least two clefts, said clefts sized to receive said ribs of said at least two planar members.

8. A modular building for a toy building set comprising:
    a planar member having a top, a bottom and edges, said planar member having at least one raised rib on said top; and
    one of a wall member and a roof member having an upper portion and a base portion, said upper portion extends substantially orthogonally from said base portion, said base portion having a cleft therein sized to receive said rib of said planar member to removably attach said wall member or roof member to said planar member, wherein a total of four of said raised ribs are present, said raised ribs disposed substantially perpendicularly to one another in a substantially cross-shaped configuration.

9. The modular building of claim 8, wherein said raised rib has beveled edges and said cleft has beveled edges complementary to said rib beveled edges.

10. The modular building of claim 8, wherein said cleft is bounded by a pair of wings, said wings being triangular in shape such that one of said wings from each of adjacent ones of said wall members or said roof members abut on said planar member when said planar member is attached to either of said wall member or said roof member.

11. The modular building of claim 10, wherein said raised ribs and said wings are the same thickness such that said top of said planar member has a uniform surface formed by said raised ribs and said wings.

12. The modular building of claim 8, wherein said planar member has attachment fittings on said bottom for removable attachment to a supporting substructure.

13. The modular building of claim 8, wherein said planar member has attachment fittings on said edges for removable attachment to a building subassembly.

14. The modular building of claim 8, further comprising:
    a coupler for attachment of at least two of said planar members, said coupler having at least two clefts, said clefts sized to receive said ribs of said at least two planar members.

15. A modular building for a toy building set comprising:
    a planar member having a top, a bottom and edges, said planar member having at least one raised rib on said top, said raised rib having beveled edges; and
    one of a wall member and a roof member having an upper portion and a base portion, said upper portion being substantially orthogonal to said base portion, said base portion having a cleft therein sized to receive said rib of said planar member to removably attach said wall member or roof member and said planar member, said cleft having beveled edges complementary to said beveled edges of said rib of said planar member, wherein at total of four of said raised ribs are present, said raised ribs disposed substantially perpendicularly to one another in a substantially cross-shaped configuration.

16. The modular building of claim 15, wherein said cleft is bounded by a pair of wings, said wings being triangular in shape such that one of said wings from each of adjacent ones of said wall members or said roof members abut on said planar member when said planar member is attached to either of said wall member or said roof member.

17. The modular building of claim 16, wherein said raised ribs and said wings are the same thickness such that said top of said planar member has a uniform surface formed by said raised ribs and said wings.

18. The modular building of claim 15, wherein said planar member has attachment fittings on said bottom for removable attachment to a supporting substructure.

19. The modular building of claim 15, wherein said planar member has attachment fittings on said edges for removable attachment to a building subassembly.

20. The modular building of claim 15, further comprising:
a coupler for attachment of at least two of said planar members, said coupler having at least two clefts, said clefts sized to receive said ribs of said at least two planar members.

21. A modular building for a toy building set comprising:
a planar member having a top, a bottom and edges, said planar member having raised ribs on said top;
one of a wall member and a roof member having an upper portion and a base portion, said upper portion being substantially orthogonal to said base portion, said base portion having a cleft therein sized to receive one of said ribs of said planar member to removably attach said wall member or roof member to said planar member; and
a coupler for attachment of said planar member to another planar member, said coupler having clefts therein sized to receive one of said ribs of each of said planar members, wherein a total of four of said raised ribs are present, said raised ribs disposed substantially perpendicularly to one another in a substantially cross-shaped configuration.

22. The modular building of claim 21, wherein said raised ribs have beveled edges and said clefts have beveled edges complementary to said beveled edges of said ribs.

23. The modular building of claim 21, wherein said clefts are bounded by a pair of wings, said wings being triangular in shape such that one of said wings from each of adjacent ones of said wall members or said roof members abut on said planar member when said planar member is attached to either of said wall member or said roof member.

24. The modular building of claim 23, wherein said raised ribs and said wings are the same thickness such that said top of said planar member has a uniform surface formed by said raised ribs and said wings.

25. The modular building of claim 21, wherein said planar member has attachment fittings on said bottom for removable attachment to a supporting substructure.

26. The modular building of claim 21, wherein said planar member has attachment fittings on said edges for removable attachment to a building subassembly.

27. A modular building for a toy building set comprising:
a planar member having a top, a bottom and edges, said planar member having raised ribs on said top, said raised ribs disposed substantially perpendicular to one another in a substantially cross-shaped configuration; and
a second member removably attachable to said planar member, said second member having at least a first planar portion extending substantially orthogonally from said second member, said planar portion having a cleft therein, said cleft sized to receive one of said ribs of said planar member.

28. The modular building of claim 27, wherein said raised ribs have beveled edges and said cleft has beveled edges complementary to said rib beveled edges.

29. The modular building of claim 27, wherein said cleft is bounded by a pair of wings, said wings being triangular in shape such that one of said wings from each of adjacent second members abut on said planar member when said second member and said planar member are attached.

30. The modular building of claim 29, wherein said raised ribs and said wings are the same thickness such that said top of said planar member has a uniform surface formed by said raised ribs and said wings.

31. The modular building of claim 27, wherein said planar member has attachment fittings on said bottom for removable attachment to a supporting substructure.

32. The modular building of claim 27, wherein said planar member has attachment fittings on said edges for removable attachment to a building subassembly.

33. The modular building of claim 27, further comprising:
a coupler for attachment of at least two of said planar members, said coupler having at least two clefts, said clefts sized to receive said ribs of said at least two planar members.

34. A modular building for a toy building set comprising:
a planar member having a top, a bottom and edges, said planar member having at least one raised rib on said top, said raised rib having beveled edges; and
one of a wall member and a roof member having an upper portion and a base portion, said upper portion being substantially orthogonal to said base portion, said base portion having a cleft therein sized to receive said rib of said planar member to removably attach said wall member or roof member and said planar member, said cleft having beveled edges complementary to said beveled edges of said rib of said planar member, wherein a total of four of said raised ribs are present, said raised ribs disposed substantially perpendicularly to one another in a substantially cross-shaped configuration.

35. A modular building for a toy building set comprising:
a planar member having a top, a bottom and edges, said planar member having at least one raised rib on said top, said raised rib having beveled edges; and
one of a wall member and a roof member having an upper portion and a base portion, said upper portion being substantially orthogonal to said base portion, said base portion having a cleft therein sized to receive said rib of said planar member to removably attach said wall member or roof member and said planar member, said cleft having beveled edges complementary to said beveled edges of said rib of said planar member, wherein said cleft is bounded by a pair of wings, said wings being triangular in shape such that one of said wings from each of adjacent wall members abut on said planar member when said wall member is removably attached to said planar member.

36. The modular building of claim 35, wherein said raised ribs and said wings are the same thickness such that said top of said planar member has a uniform surface formed by said raised ribs and said wings.

37. A modular building for a toy building set comprising:
a planar member having a top, a bottom and edges, said planar member having raised ribs on said top;
one of a wall member and a roof member having an upper portion and a base portion, said upper portion being substantially orthogonal to said base portion, said base portion having a cleft therein sized to receive one of said ribs of said planar member to removably attach said wall member or roof member to said planar member; and
a coupler for attachment of said planar member to another planar member, said coupler having clefts therein sized to receive one of said ribs of each of said planar members, wherein four of said raised ribs are present, said raised ribs disposed substantially perpendicularly to one another in a substantially cross-shaped configuration.

38. A modular building for a toy building set comprising:
a planar member having a top, a bottom and edges, said planar member having raised ribs on said top;
one of a wall member and a roof member having an upper portion and a base portion, said upper portion being substantially orthogonal to said base portion, said base portion having a cleft therein sized to receive one of said ribs of said planar member to removably attach said wall member or roof member to said planar member; and
a coupler for attachment of said planar member to another planar member, said coupler having clefts therein sized to receive one of said ribs of each of said planar members, wherein said clefts are bounded by a pair of wings, said wings being triangular in shape such that one of said wings from each of adjacent wall members abut on said planar member when said wall member is removably attached to said planar member.

39. The modular building of claim 38, wherein said raised ribs and said wings are the same thickness such that said top of said planar member has a uniform surface formed by said raised ribs and said wings.

40. A modular building for a toy building set comprising:
a planar member having a top, a bottom and edges, said planar member having a raised rib on said top; and
a second member removably attachable to said planar member, said second member having at least a first planar portion extending substantially orthogonally from said second member, said planar portion having a cleft therein, said cleft sized to receive said rib of said planar member;
wherein said cleft is bounded by a pair of wings, said wings being triangular in shape such that one of said wings from each of adjacent second members abut on said planar member when said second member and said planar member are attached.

41. The modular building of claim 40, wherein said raised ribs and said wings are the same thickness such that said top of said planar member has a uniform surface formed by said raised ribs and said wings.

42. A modular building for a toy building set comprising:
a planar member having a top, a bottom and edges, said planar member having a raised rib on said top; and
one of a wall member and a roof member having an upper portion and a base portion, said upper portion extends substantially orthogonally from said base portion, said base portion having a cleft therein sized to receive said rib of said planar member to removably attach said wall member or roof member to said planar member, wherein said cleft is bounded by a pair of wings, said wings being triangular in shape such that one of said wings from each of adjacent wall members abut on said planar member.

43. The modular building of claim 42, wherein said raised ribs and said wings are the same thickness such that said top of said planar member has a uniform surface formed by said raised ribs and said wings.

44. A modular building for a toy building set comprising:
a planar member having a top, a bottom and edges, said planar member having a raised rib on said top, said raised rib having beveled edges; and
one of a wall member and a roof member having an upper portion and a base portion, said upper portion being substantially orthogonal to said base portion, said base portion having a cleft therein sized to receive said rib of said planar member to removably attach said wall member or roof member and said planar member, said cleft having beveled edges complementary to said beveled edges of said rib of said planar member, wherein said cleft is bounded by a pair of wings, said wings being triangular in shape such that one of said wings from each of adjacent ones of said wall members or said roof member abut on said planar member when said planar member is attached to either of said wall member or said roof member.

45. The modular building of claim 44, wherein said raised ribs and said wings are the same thickness such that said top of said planar member has a uniform surface formed by said raised ribs and said wings.

46. A modular building for a toy building set comprising:
a planar member having a top, a bottom and edges, said planar member having raised ribs on said top;
one of a wall member and a roof member having an upper portion and a base portion, said upper portion being substantially orthogonal to said base portion, said base portion having a cleft therein sized to receive one of said ribs of said planar member to removably attach said wall member or roof member to said planar member; and
a coupler for attachment of said planar member to another planar member, said coupler having clefts therein sized to receive one of said ribs of each of said planar members, wherein said clefts are bounded by a pair of wings, said wings being triangular in shape such that one of said wings from each of adjacent ones of said wall members or said roof member abut on said planar member when said planar member is attached to either of said wall member or said roof member.

47. The modular building of claim 46, wherein said raised ribs and said wings are the same thickness such that said top of said planar member has a uniform surface formed by said raised ribs and said wings.

* * * * *